US005689434A

United States Patent [19]

Tambini et al.

[11] Patent Number: 5,689,434

[45] Date of Patent: Nov. 18, 1997

[54] MONITORING AND CONTROL OF FLUID DRIVEN TOOLS

[75] Inventors: Angelo L. Tambini, County Wicklow, Ireland; John Linehan, Horsham, Pa.

[73] Assignee: Ingersoll-Rand Company, Phillipsburg, N.J.

[21] Appl. No.: 671,833

[22] Filed: Jun. 28, 1996

Related U.S. Application Data

[60] Division of Ser. No. 986,027, Dec. 4, 1992, Pat. No. 5,592,396, which is a continuation-in-part of Ser. No. 927,853, Aug. 10, 1992, abandoned.

[51] Int. Cl.[6] .......... B23Q 5/00

[52] U.S. Cl. .......... 364/510; 73/862.23

[58] Field of Search .......... 73/862.21, 862.27; 364/506, 509, 510–514 A, 486, 487

[56] References Cited

U.S. PATENT DOCUMENTS

| | | | |
|---|---|---|---|
| 3,780,603 | 12/1973 | Whitaker | 173/183 |
| 4,000,782 | 1/1977 | Finkleston . | |
| 4,027,530 | 6/1977 | Tambini et al. . | |
| 4,185,701 | 1/1980 | Boys . | |
| 4,294,110 | 10/1981 | Whitehouse . | |
| 4,316,512 | 2/1982 | Kibblewhite et al. . | |
| 4,633,719 | 1/1987 | Vander Heyden . | |
| 4,681,569 | 7/1987 | Coble et al. . | |
| 4,700,579 | 10/1987 | Hall . | |
| 4,921,049 | 5/1990 | Adam . | |
| 5,113,949 | 5/1992 | Ohkubo et al. | 73/862.21 |
| 5,421,240 | 6/1995 | Ohta et al. | 173/177 |

FOREIGN PATENT DOCUMENTS

| | | |
|---|---|---|
| A-0 363 587 | 4/1990 | European Pat. Off. . |
| 3221658A-1 | 8/1982 | Germany . |
| A-03 060 983 | 3/1991 | Japan . |
| A-2 042 190 | 9/1980 | United Kingdom . |

*Primary Examiner*—James P. Trammell
*Assistant Examiner*—Craig Steven Miller
*Attorney, Agent, or Firm*—Curtis, Morris & Safford

[57] ABSTRACT

A system for monitoring and/or controlling the torque applied by a fluid driven tool for driving threaded fasteners, such as tools driven by either air or oil. The system includes a fluid flow meter to measure a parameter which is a function of the rate of fluid flow into the tool during operation of the tool, a transducer for converting the measured parameter into an electrical signal, and a data processing unit for processing that electrical signal into a signal representative of the torque applied by said tool. A system for digitally processing the measured parameter and comparing it to predetermined expected parameters to infer the condition of the fluid driven tool and for reporting that inferred condition is also included. The system is applicable to both nutrunner type fluid tools and impact wrenches.

11 Claims, 26 Drawing Sheets

| | PRELOAD kN | INITIAL FLOW VOLTS | BREAKFORWARD TORQUE Nm | FLOW GRADIENT MAX. | FLOW GRADIENT MIN. |
|---|---|---|---|---|---|
| | 19.6 | 2.48 | 32 | .53 | 0.34 |
| | 20.0 | 2.55 | 33 | .59 | 0.4 |
| | 19.6 | 2.49 | 32 | .58 | 0.35 |
| | 20.7 | 2.54 | 37 | .65 | 0.10 |
| | 20.4 | 2.43 | 36 | .59 | 0.46 |
| | 20.6 | 2.43 | 34 | .57 | 0.36 |
| | 17.8 | 2.45 | 30 | .55 | 0.35 |
| | 20.3 | 2.49 | 32 | .60 | 0.29 |
| | 18.9 | 2.39 | 32 | .55 | 0.38 |
| | 19.7 | 2.14 | 32 | .50 | 0.16 |
| | 18.4 | 2.54 | 30 | .69 | 0.07 |
| | 20.5 | 2.43 | 35 | .59 | 0.40 |
| | 19.0 | 2.48 | 33 | .69 | 0.24 |
| | 21.0 | 2.46 | 34 | .54 | 0.38 |
| | 17.8 | 2.46 | 30 | .44 | 0.11 |
| AVERAGE | 19.6 | 2.45 | 32.8 | .59 | |
| STANDARD DEV. | 1.0 | 0.094 | 2.04 | .054 | |

FIG. 6

| | PRELOAD kN | INITIAL FLOW VOLTS | BREAKFORWARD TORQUE Nm | FLOW GRADIENT MAX. | FLOW GRADIENT MIN. |
|---|---|---|---|---|---|
| | 23.2 | 2.8 | 36 | .68 | 0.19 |
| | 23.3 | 2.8 | 38 | .67 | 0.50 |
| | 23.2 | 2.75 | 36 | .76 | 0.23 |
| | 23.4 | 2.73 | 38 | .64 | 0.52 |
| | 22.0 | 2.87 | 37 | .64 | 0.37 |
| | 24.1 | 2.84 | 38 | .73 | 0.37 |
| | 24.0 | 2.93 | 38 | .64 | 0.40 |
| | 24.6 | 2.84 | 38 | .74 | 0.44 |
| | 23.9 | 2.78 | 39 | .62 | 0.47 |
| | 23.7 | 2.82 | 36 | .66 | 0.47 |
| | 22.6 | 2.87 | 37 | .60 | 0.30 |
| | 22.8 | 2.78 | 38 | .66 | 0.48 |
| | 23.3 | 2.85 | 39 | .62 | 0.44 |
| | 22.0 | 2.78 | 37 | .69 | 0.54 |
| AVERAGE | 23.3 | 2.82 | 37.5 | .66 | |
| STANDARD DEV. | .74 | .052 | 0.98 | .046 | |

FIG. 7

| | PRELOAD kN | INITIAL FLOW VOLTS | BREAKFORWARD TORQUE Nm | FLOW GRADIENT MAX. | MIN. |
|---|---|---|---|---|---|
| | 22.1 | 3.17 | 46 | .76 | .57 |
| | 22.6 | 3.29 | 42 | .73 | .54 |
| | 24.7 | 3.18 | 48 | .69 | .61 |
| | 23.9 | 3.15 | 44 | .68 | .39 |
| | 25.1 | 3.15 | 44 | .71 | .49 |
| | 26.0 | 3.18 | 46 | .77 | .57 |
| | 25.2 | 3.12 | 46 | .80 | .47 |
| | 26.6 | 3.24 | 48 | .70 | .54 |
| | 25.4 | 3.37 | 42 | .85 | .40 |
| | 25.6 | 3.12 | 46 | .71 | .54 |
| | 27.0 | 3.17 | 45 | .76 | .44 |
| | 27.7 | 3.37 | 48 | .71 | .44 |
| | 26.2 | 3.08 | 44 | .74 | .36 |
| | 25.2 | 3.28 | 43 | .69 | .46 |
| | 27.0 | 3.15 | 43 | .63 | .52 |
| AVERAGE | 25.3 | 3.2 | 45 | .73 | |
| STANDARD DEV. | 1.52 | .08 | 2.0 | .052 | |

FIG. 8

| | PRELOAD kN | INITIAL FLOW VOLTS | BREAKFORWARD TORQUE Nm | FLOW GRADIENT MAX. | FLOW GRADIENT MIN. |
|---|---|---|---|---|---|
| | 16.4 | 2.74 | 36 | .43 | .25 |
| | 16.3 | 2.72 | 38 | .43 | .27 |
| | 17.5 | 2.69 | 34 | .44 | .18 |
| | 17.7 | 2.68 | 36 | .36 | .25 |
| | 19.2 | 2.81 | 36 | .35 | .24 |
| | 18.4 | 2.76 | 37 | .39 | .21 |
| | 15.5 | 2.71 | 34 | .36 | .24 |
| | 16.4 | 2.71 | 35 | .46 | .20 |
| | 17.1 | 2.75 | 34 | .44 | .29 |
| | 17.7 | 2.75 | 36 | .45 | .22 |
| | 19.1 | 2.82 | 35 | .40 | .28 |
| | 16.3 | 2.81 | 35 | .44 | .25 |
| | 16.4 | 2.81 | 30 | .40 | .19 |
| | 17.4 | 2.68 | 32 | .57 | .41 |
| | 17.9 | 2.88 | 34 | .40 | .20 |
| AVERAGE | 17.3 | 2.75 | 34.1 | .42 | |
| STANDARD DEV. | 1.05 | .057 | 3.1 | .052 | |

FIG. 9

| | INITIAL FLOW VOLTS | BREAKFORWARD TORQUE Nm | FLOW GRADIENT | |
|---|---|---|---|---|
| | | | MAX. | MIN. |
| | 2.81 | 41 | 94 | .69 |
| | 2.80 | 40 | 88 | .58 |
| | 2.76 | 41 | 1.01 | .74 |
| | 2.72 | 41 | .92 | .66 |
| | 2.75 | 39 | 1.00 | .60 |
| | 2.72 | 42 | .89 | .57 |
| | 2.86 | 38 | .89 | .69 |
| | 2.83 | 41 | .88 | .60 |
| | 2.64 | 36 | .90 | .54 |
| | 2.78 | 37 | .87 | .70 |
| | 2.76 | 35 | .86 | .71 |
| | 2.71 | 43 | .77 | .45 |
| | 2.77 | 36 | .75 | .50 |
| | 2.62 | 35 | .92 | .60 |
| | 2.78 | 39 | 1.00 | .67 |
| AVERAGE | 2.75 | 38.9 | .90 | |
| STANDARD DEV. | .062 | 2.58 | .072 | |

FIG. 10

DETECTABLE TOOL AND PROCESS CONDITIONS
AIR RAN

| | | EFFECT | | PROBABLE CAUSE |
|---|---|---|---|---|
| SPEED | 1 | HIGH SPEED | | TOOL IS TOO FAST |
| | | | (a) | PRESSURE HIGHER THAN AT PREVIOUSLY CALIBRATED |
| | | | (b) | OIL IN THE LINE CAUSING OVERLUBRICATION |
| | | | (c) | TOOL SWAPPED |
| | | | (d) | LEAK IN HOSE AFTER SENSOR |
| | 2 | LOW SPEED | | TOOL IS TOO SLOW |
| | | | (a) | PRESSURE MOMENTARILY DROPPED |
| | | | (b) | PRESSURE SUPPLY LOWER THAN AT PREVIOUSLY CALIBRATED |
| | | | (c) | LEAK IN HOSE BEFORE SENSOR |
| | | | (d) | WATER IN AIR SUPPLY LINE |
| | | | (e) | GEARS NEED MAINTENANCE |
| | | | (f) | TOOL SWAPPED |
| | | | (g) | PREVAILING TORQUE |
| | 3 | OUTSIDE LIMIT | | TOOL HAS STALLED |
| | | | (a) | JOINT HAS PREVIOUSLY BEEN TIGHTENED |
| | 4 | NORMAL | | SUPPLY AND TOOL IN CALIBRATED CONDITION |
| JOINT SLOPE | 5 | HARD | | FAST SHUTOFF - HARD JOINT |
| | | | (a) | THREADS CROSSED |
| | | | (b) | SCREW BOTTOMED |
| | | | (c) | MISSING WASHER OR GASKET |
| | | | (f) | WRONG SCREW |
| | | | (e) | NO SCREW |
| | 6 | SOFT | | SLOW SHUTOFF - SOFT JOINT |
| | | | (a) | JOINT NOT MATING PROPERLY |
| | | | (b) | EXTRA GASKET OR WASHER |
| | | | (c) | GREEN SCREW |
| | 7 | OUTSIDE LIMIT | | PREMATURE SHUTOFF |
| | | | (a) | NO SCREW |
| | | | (b) | SCREW BROKEN |
| | 8 | NORMAL | | BOLT AND JOINT IN SAME CONDITION AS WHEN SYSTEM CALIBRATED |

FIG. 20

DETECTABLE TOOL AND PROCESS CONDITIONS
IMPACT WRENCH

| | | EFFECT | | PROBABLE CAUSE |
|---|---|---|---|---|
| SPEED | 1 | HIGH SPEED | | TOOL IS TOO FAST |
| | | | (a) | PRESSURE HIGHER THAN AT PREVIOUSLY CALIBRATED |
| | | | (b) | OIL IN THE LINE CAUSING OVERLUBRICATION |
| | | | (c) | TOOL SWAPPED |
| | | | (d) | LEAK IN HOSE AFTER SENSOR |
| | 2 | LOW SPEED | | TOOL IS TOO SLOW |
| | | | (a) | PRESSURE MOMENTARILY DROPPED |
| | | | (b) | PRESSURE SUPPLY LOWER THAN AT PREVIOUSLY CALIBRATED |
| | | | (c) | LEAK IN HOSE BEFORE SENSOR |
| | | | (d) | WATER IN AIR SUPPLY LINE |
| | | | (e) | GEARS NEED MAINTENANCE |
| | | | (f) | TOOL SWAPPED |
| | | | (g) | PREVAILING TORQUE |
| | 3 | OUTSIDE LIMIT NO RUNDOWN PHASE | | TOOL HAS STALLED |
| | | | (a) | JOINT HAS PREVIOUSLY BEEN TIGHTENED |
| | 3 | NORMAL | | SUPPLY AND TOOL IN CALIBRATED CONDITION |
| # OF PULSES | 4 | HIGH | | LATE SHUTOFF |
| | | | (a) | HELD TOO LONG BY OPERATOR |
| | | | (b) | PRETIGHTENED FASTENER |
| | | | (c) | SCROW JAMMED |
| | 5 | LOW | | LATE SHUTOFF |
| | | | (a) | RELEASED TOO EARLY BY OPERATOR |
| | | | (b) | SCREW BROKEN |
| | 6 | NO PULSES | | PREMATURE SHUTOFF |
| | | | (a) | NO SCREW |
| PULSE RATE | 7 | HIGH PULSE RATE | | HARD JOINT |
| | | | (a) | THREADS CROSSED |
| | | | (b) | SCREW BOTTOMED |
| | | | (c) | MISSING WASHER OR GASKET |
| | | | (d) | WRONG SCREW |
| | 8 | LOW PULSE RATE | | SOFT JOINT |
| | | | (a) | JOINT NOT MATING PROPERLY |
| | | | (b) | EXTRA GASKET OR WASHER |
| | | | (c) | GREEN SCREW |
| | 9 | NORMAL # AND RATE | | BOLT AND JOINT IN SAME CONDITION AS WHEN SYSTEM CALIBRATED |

FIG. 21

MONITORING AND CONTROL OF FLUID DRIVEN TOOLS

BACKGROUND OF THE INVENTION

This application is a divisional application of Ser. No. 07/986,027 filed Dec. 4, 1992, now U.S. Pat. No. 5,592,396, which is a continuation in part of application Ser. No. 07/927,853, filed Aug. 10, 1992 now abandoned.

This invention relates generally uto the field of fluid driven tools for driving threaded fasteners, and more particularly to monitoring and control systems for such fluid driven tools.

Fluid driven tools are very commonly used for driving threaded fasteners. Such tools may be driven by either air or oil. Two types of such fluid driven tools are the nutrunner tool and the impact wrench.

An air driven nutrunner tool has a continuous drive air motor, such as a turbine, for driving the fastener. An oil driven nutrunner operates in a similar manner, but may use a positive displacement drive (such as a gear or vane motor) in lieu of the turbine. It is desirable to monitor the torque applied by a nutrunner tool in order to monitor and/or control various conditions of the fastener, tool and joint, such as lubrication of the tool and/or fastener, existence of cross-threading, joint condition, and final tightened torque. Although it is possible to measure torque on a nutrunner directly by means of a strain gauge reaction torque transducer, measurement of the torque of a nutrunner by means of a strain gauge has been difficult and can be complicated by movement of the tool during tightening. Such strain gauge transducers also considerably increase the cost of the nutrunner. Moreover, such strain gauges must generally be designed into the nutrunner, and cannot be conveniently retrofitted.

An impact wrench operates by releasing a periodic build up of kinetic energy in the form of a series of torsional shock impulses transmitted to a fastener assembly, which may typically include a bolt and/or nut. As a result, considerable impact forces can be produced with little reactive torque.

An air driven impact wrench typically includes a vane type air motor and a hammer/anvil mechanism. When the air motor gains sufficient speed, a high inertia hammer on the motor shaft engages an anvil on the wrench drive shaft. The energy of the blow is converted into several forms. It is (a) dissipated as a result of collision inelasticity and friction; (b) stored as torsional strain energy in the impact mechanism, the wrench drive shaft and the coupling to the fastener; and (c) transferred to the fastener, and converted to the work of tightening. The hammer then disengages from the anvil and the motor accelerates for, typically, a complete revolution before delivering the next blow.

An oil pulse impact wrench is similar, except the hammer/anvil mechanism is enclosed in a chamber filled with hydraulic fluid and has the effect of damping the backlash and providing more smooth operation resulting in less noise and operator fatigue.

It is desireable to monitor and/or control the performance of impact wrenches for many of the same reasons as for nutrunner wrenches. However, because an impact wrench applies torque to the fastener by means of a series of impacts, it is difficult to measure directly the torque applied by an impact wrench. Consequently, it is difficult to control tightening accurately.

Due to the foregoing limitations of convenient torque measurement, it has been difficult to monitor and/or control the performance of air or oil powered nutrunner and impact wrenches.

It is a discovery of the present invention that measurement of the fluid flow through a nutrunner or impact fluid powered tool provides information on the torque applied by the tool and process conditions affecting the tool and the tightening process. This information can then be used either to control or monitor the performance of the tool. Furthermore, measurement of the fluid flow to obtain information on the torque and process conditions can be accomplished without having to modify the tool.

OBJECTS OF THE INVENTION

It is an object of the present invention to provide a monitoring and control system for nutrunner and impact fluid tools which overcomes the disadvantages of prior systems.

It is an object of the present invention to provide a monitoring and control system for nutrunner and impact fluid tools which provides information on the torque applied by the tool by measuring fluid flow to the tool.

It is an object of the present invention to provide a monitoring and control system for nutrunner and impact fluid tools which provides information on changes in the expected conditions of tightening of the joint and/or tool by measuring fluid flow to the tool.

It another object of the present invention to provide a monitoring and control system for nutrunner and impact fluid tools which is inexpensive, simple and rugged.

It is a yet further object of the present invention to provide a monitoring and control system for nutrunner and impact fluid tools that can be fitted in line with the existing fluid tool supply with no modification of the tool.

It is a further object of the present invention to provide process information regarding the tightening performance based on an automated analysis of the measured data.

SUMMARY OF THE INVENTION

These objectives are accomplished in a system for monitoring a fluid driven tool for driving threaded fasteners comprising means for measuring the rate of fluid flow into the tool during operation of the tool; means for converting the measured fluid flow rate into an electrical signal representative of the magnitude of said fluid flow rate; means for electrically processing said signal to compute at least one parameter which is a function of said fluid flow rate; and means for displaying said parameter.

These objectives are also accomplished in a system for monitoring a fluid driven impact wrench for driving threaded fasteners comprising means for measuring the rate of fluid flow into the wrench during operation of the tool; means for converting the measured fluid flow rate into an electrical signal; means for electrically processing said signal to compute at least one parameter which is a function of said fluid flow rate; and means for displaying said parameter.

These objectives are also accomplished in a system for controlling a fluid driven impact wrench for driving threaded fasteners comprising means for measuring the rate of fluid flow into the wrench from a fluid supply during operation of the tool; means for converting the measured fluid flow rate into an electrical signal; means for electrically processing said signal to count the number of blows delivered by the wrench; means to shut-off the fluid supply to the tool when a predetermined number of blows have been delivered and means for displaying the number of blows counted.

These objectives are also accomplished in a system for monitoring a fluid driven tool for driving threaded fasteners comprising means for measuring fluid flow rate into the tool during operation of the tool; means for converting said measured fluid flow rate into an electrical signal representative of the magnitude of said fluid flow rate; means for electrically processing said signal to compute at least one parameter which is a function of said fluid flow rate; means for comparing said at least one parameter to predetermined expected parameters to infer a process condition relating to said fluid driven tool; and means for reporting said inferred process condition.

BRIEF DESCRIPTION OF THE DRAWINGS

These and other objects and advantages of the present invention will be apparent to those skilled in the art upon review of the specification and drawings herein, where.

FIG. **4*a*** depicts a typical display in graphical format showing the initial flow rate (prior to snug point) and the flow rate gradient range graph (minimum and maximum) during tightening for the five most recent tightenings, when all tightenings are within specification.

FIG. **4*b*** depicts a typical display in graphical format showing the initial flow rate (prior to snug point) and the flow rate gradient range graph (minimum and maximum) during tightening for the five most recent tightenings, when the fifth tightening is outside of specification.

Figure 5:
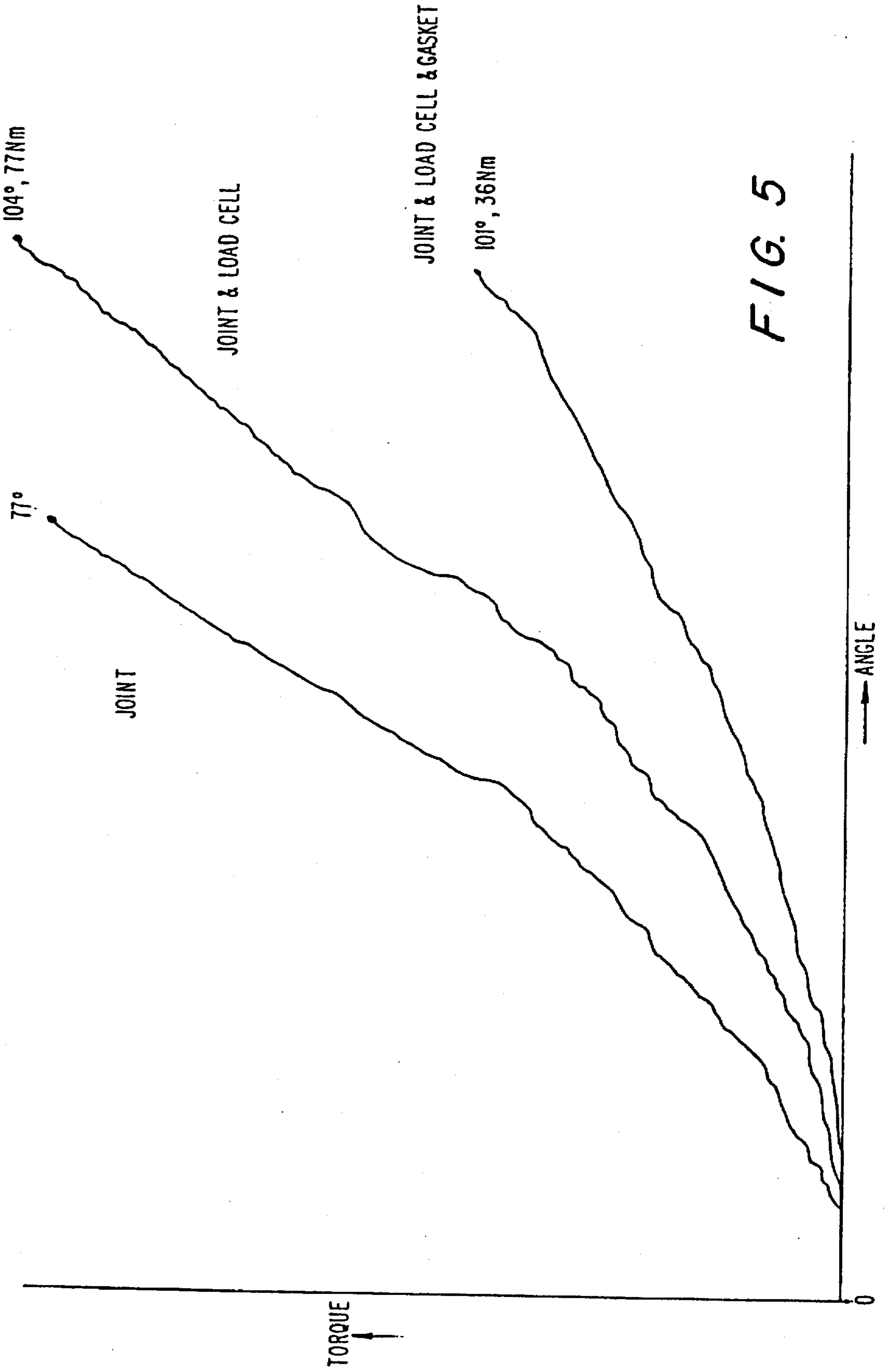

FIG. 5 is a graph of torque vs. angle for three joints having different hardnesses: joint alone; joint and load cell; and joint, load cell and gasket.

FIG. 6 is a table of data for a series of tightenings for the joint and load cell graphed in FIG. 5, at an air pressure of 60 psi, showing preload (kN); initial flow signal (volts); breakforward torque (Nm); and flow gradient (maximum and minimum).

FIG. 7 is a table of data for a series of tightenings for the joint with load cell graphed in FIG. 5, at an air pressure of 70 psi, showing preload (kN); initial flow signal (volts); breakforward torque (Nm); and flow gradient (maximum and minimum).

FIG. 8 is a table of data for a series of tightenings for the joint with load cell graphed in FIG. 5, at an air pressure of 80 psi, showing preload (kN); initial flow signal (volts); breakforward torque (Nm); and flow gradient (maximum and minimum).

FIG. 9 is a table of data for a series of tightenings for the joint load cell and gasket graphed in FIG. 5, at an air pressure of 70 psi, showing preload (kN); initial flow signal (volts); breakforward torque (Nm); and flow gradient (maximum and minimum).

FIG. 10 is a table of data for a series of tightenings for the joint only graphed in FIG. 5, at an air pressure of 70 psi, showing preload (kN); initial flow signal (volts); breakforward torque (Nm); and flow gradient (maximum and minimum).

Figure 11:
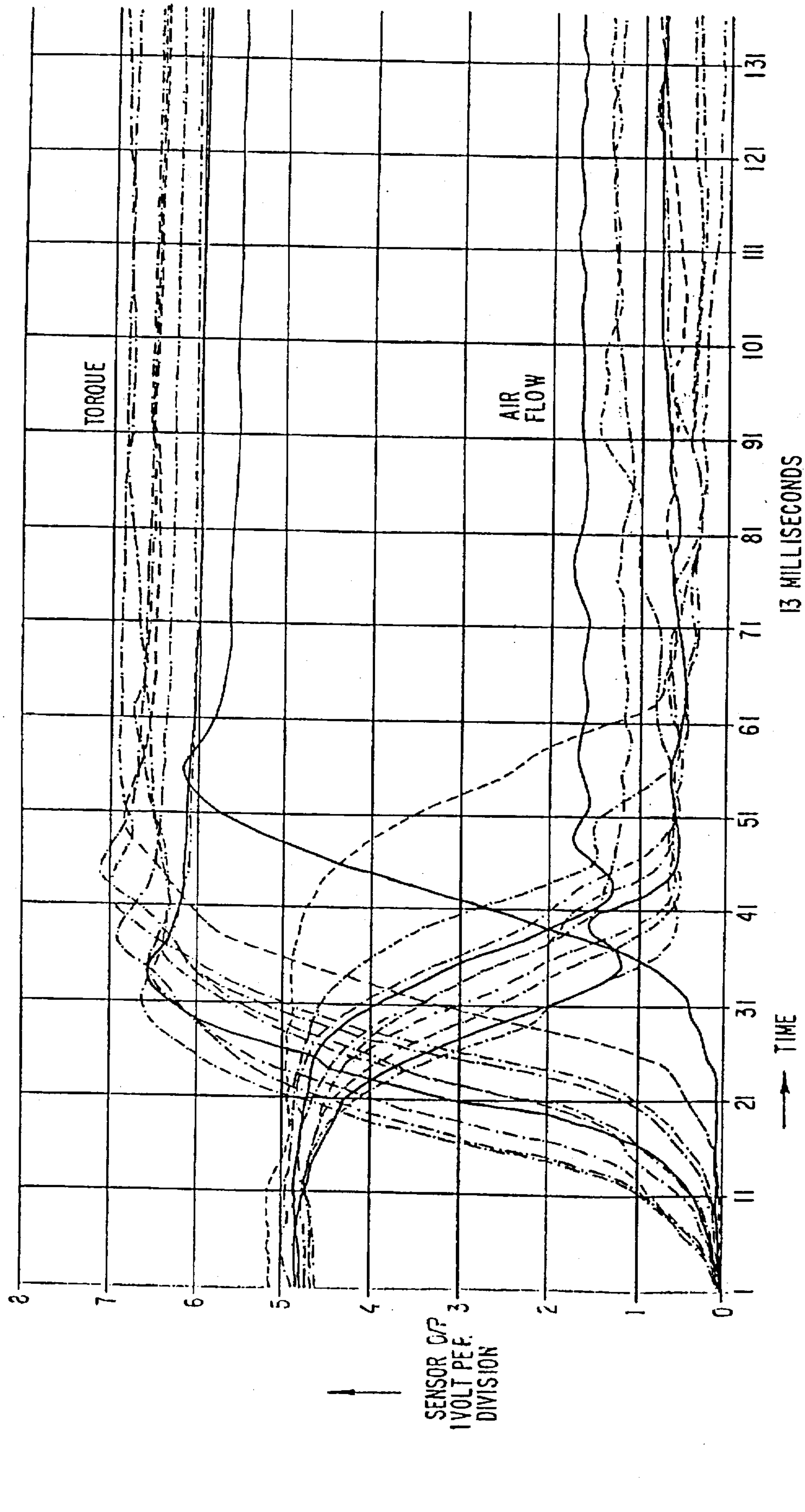

FIG. 11 is a graph of both air flow vs. time and torque vs. time for the tightenings summarized in FIG. 6.

Figure 12:
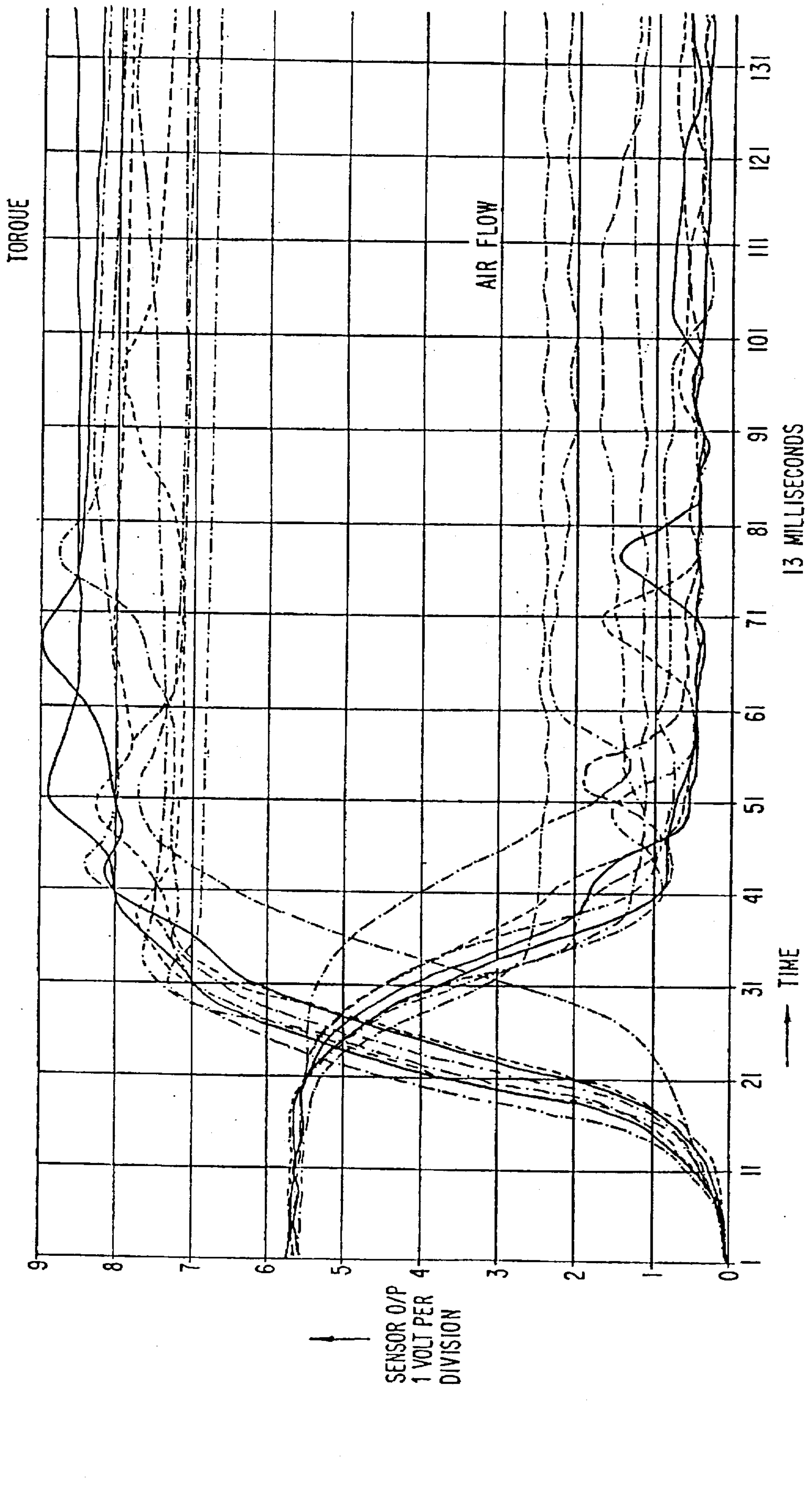

FIG. 12 is a graph of both air flow vs. time and torque vs. time for the tightenings summarized in FIG. 7.

Figure 13:
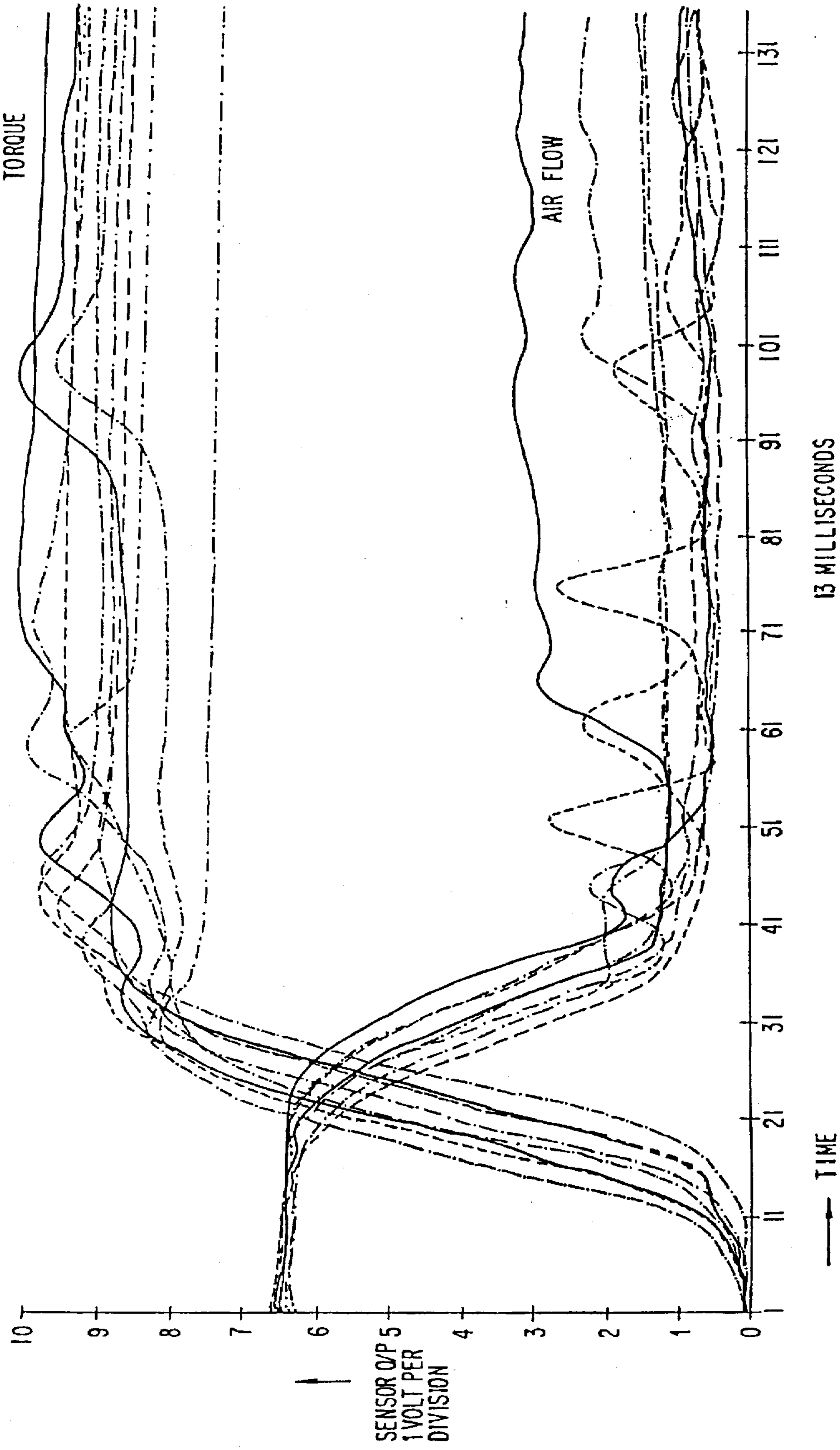

FIG. 13 is a graph of both air flow vs. time and torque vs. time for the tightenings summarized in FIG. 8.

Figure 14:
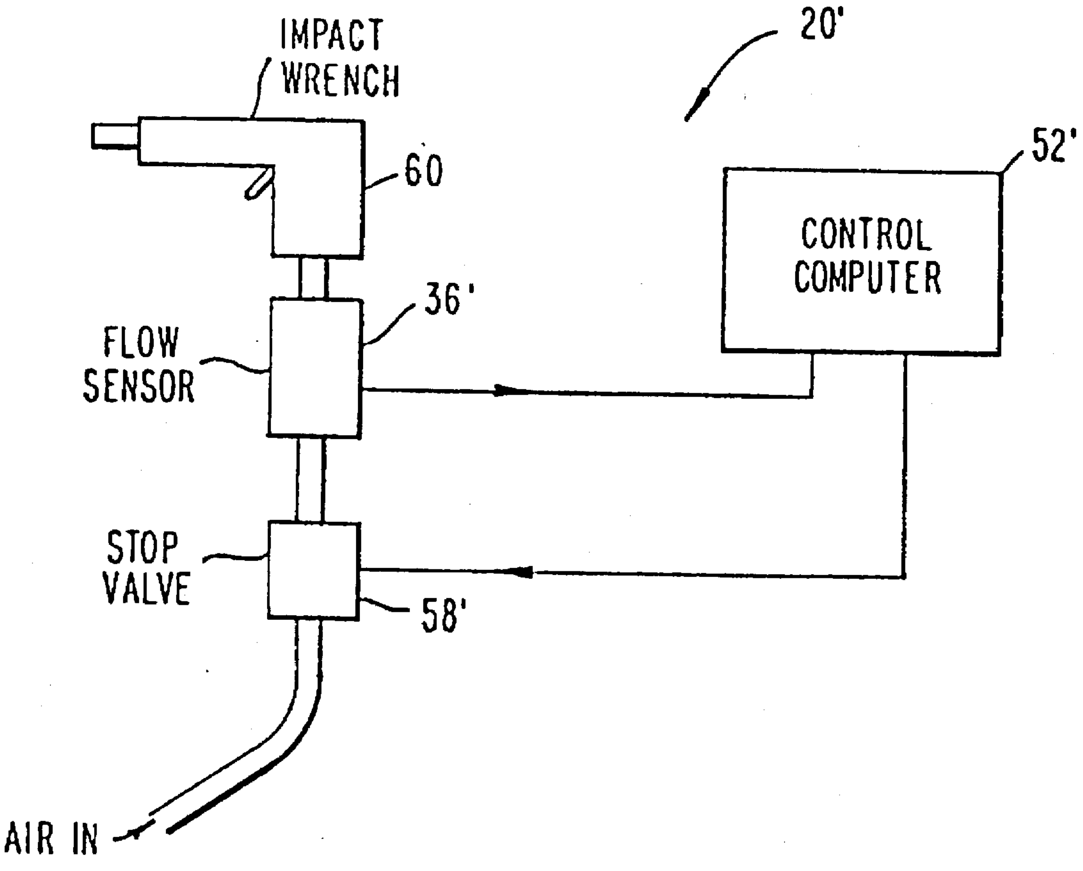

FIG. 14 is a schematic block diagram of a monitoring and control system for an impact fluid tool in accordance with a preferred embodiment of the present invention.

Figure 15:
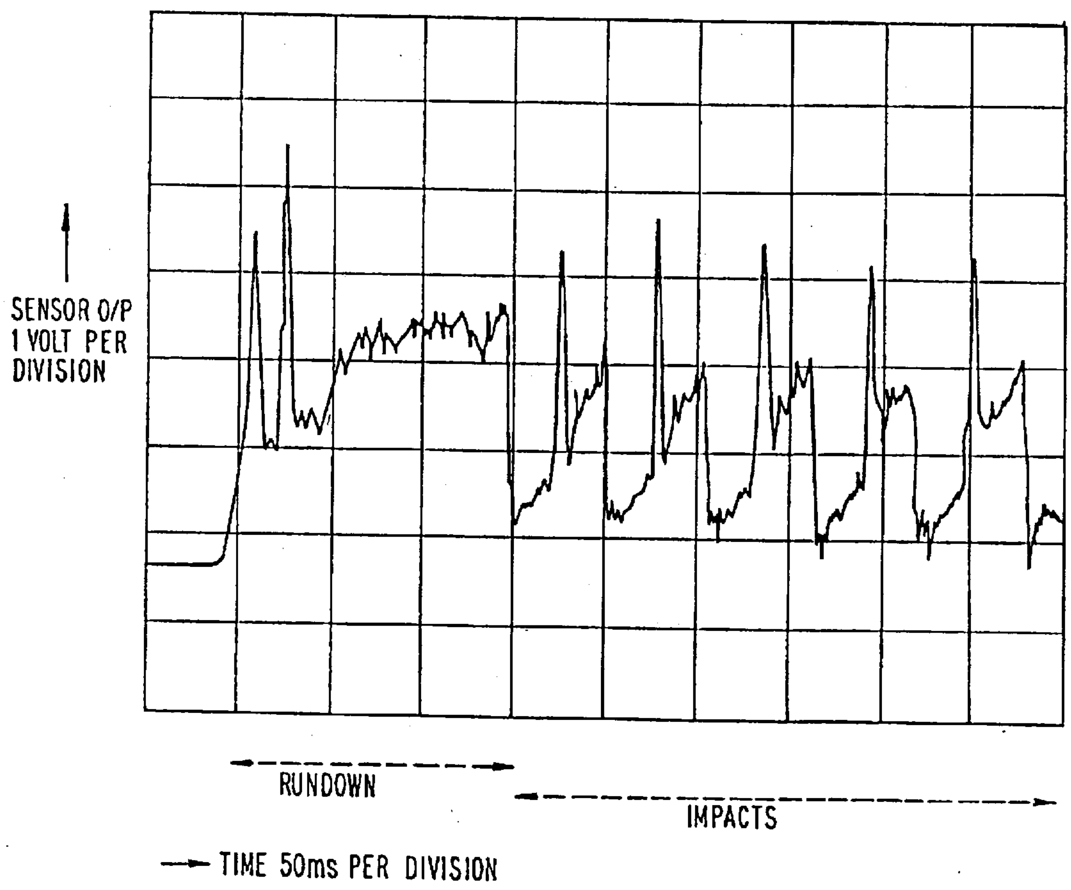

FIG. 15 is a graph of the output signal from the flow meter of the monitoring and control system of the present invention vs. time, during tightening by an impact air wrench.

Figure 16:
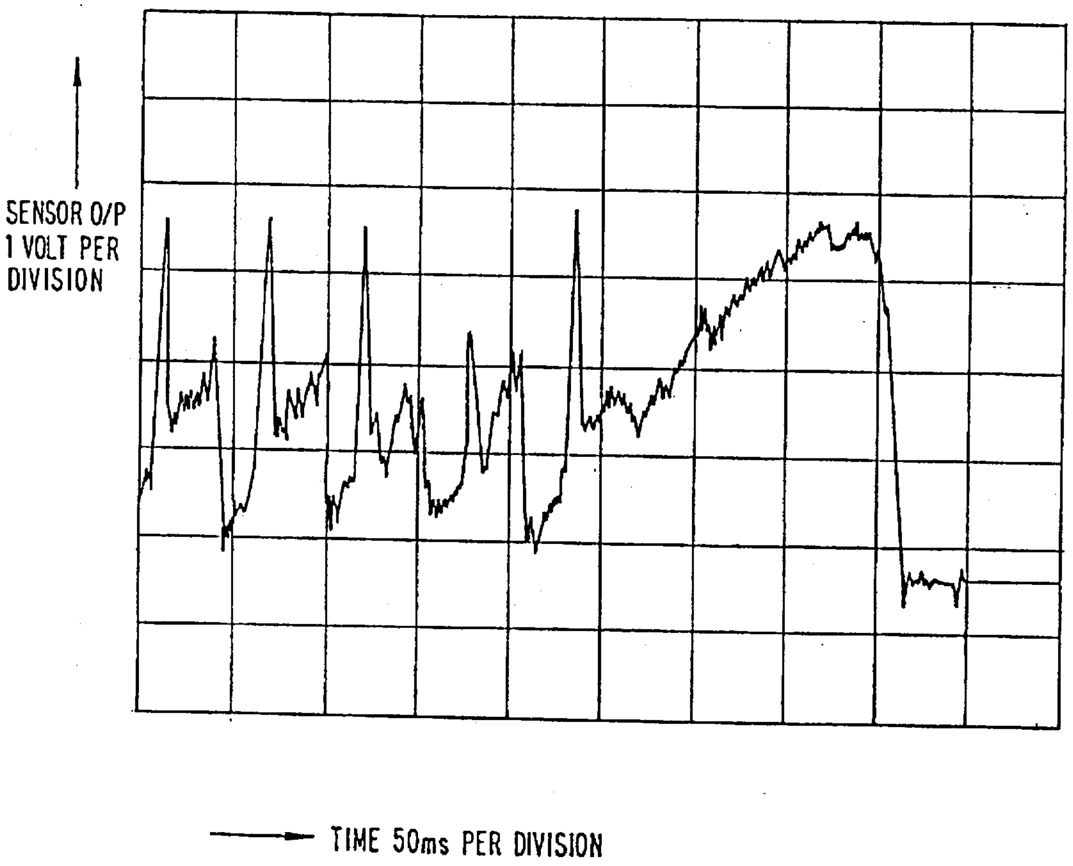

FIG. 16 is a graph of the output signal from the flow meter of the monitoring and control system of the present invention vs. time, during untightening by an impact air wrench.

Figure 17:
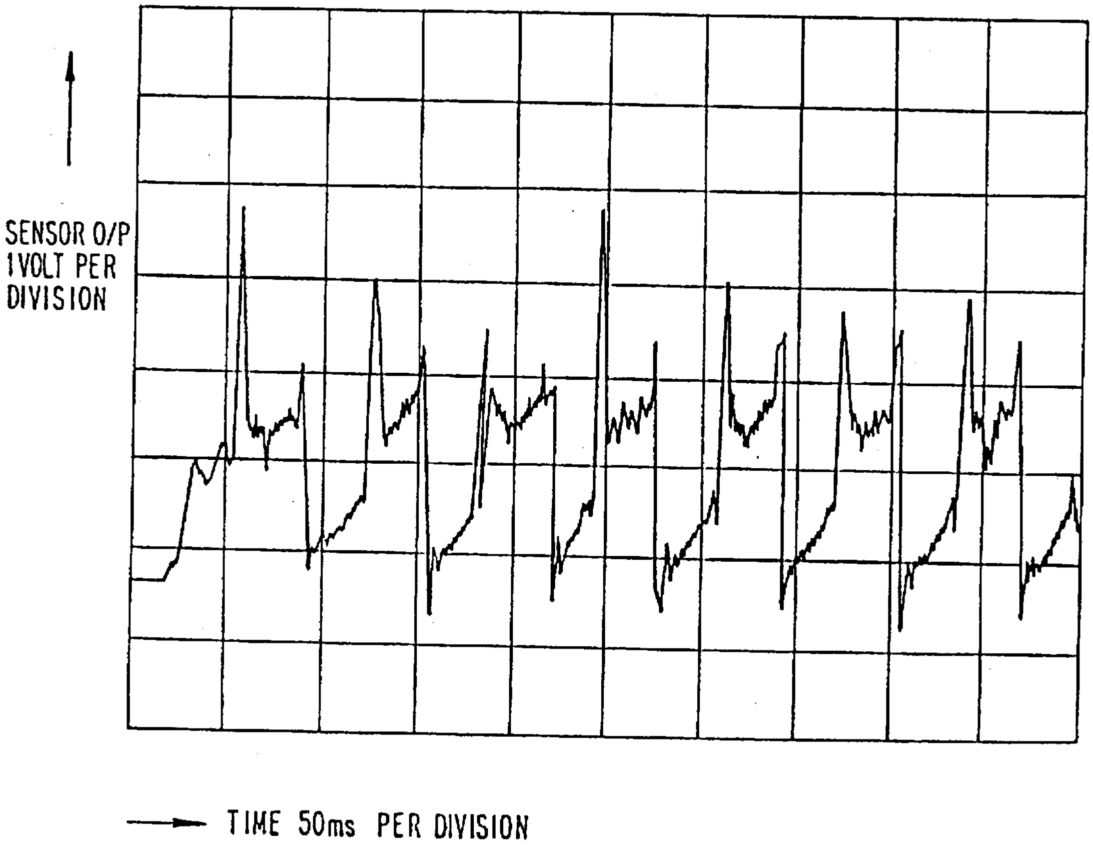

FIG. 17 is a graph of the output signal from the flow meter of the monitoring and control system of the present invention vs. time, during tightening of a pretightened screw by an impact air wrench.

Figure 18:
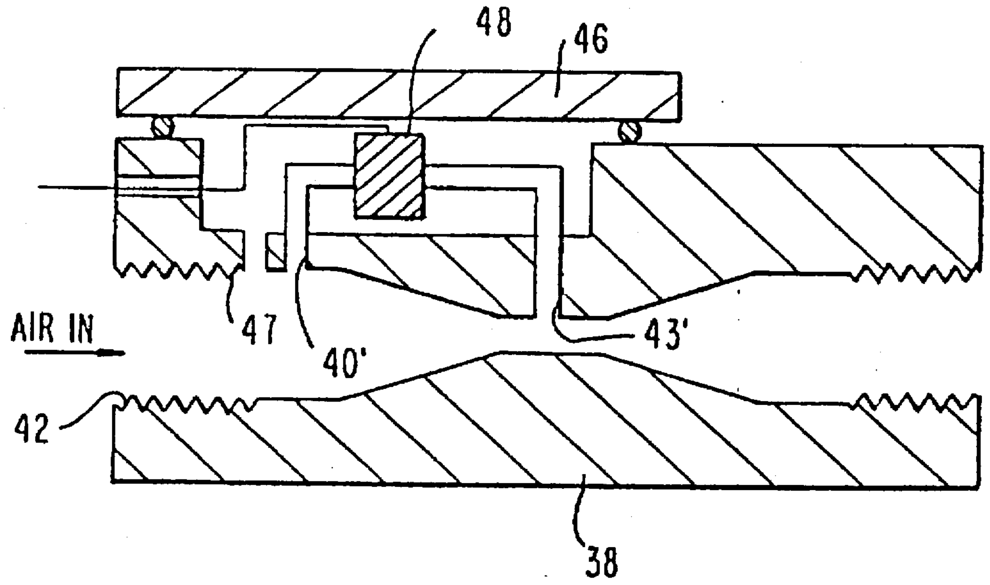

FIG. 18 depicts is a sectional view of an alternative embodiment of a fluid flow meter for use in a monitoring and control system in accordance with a preferred embodiment of the present invention.

Figure 19:
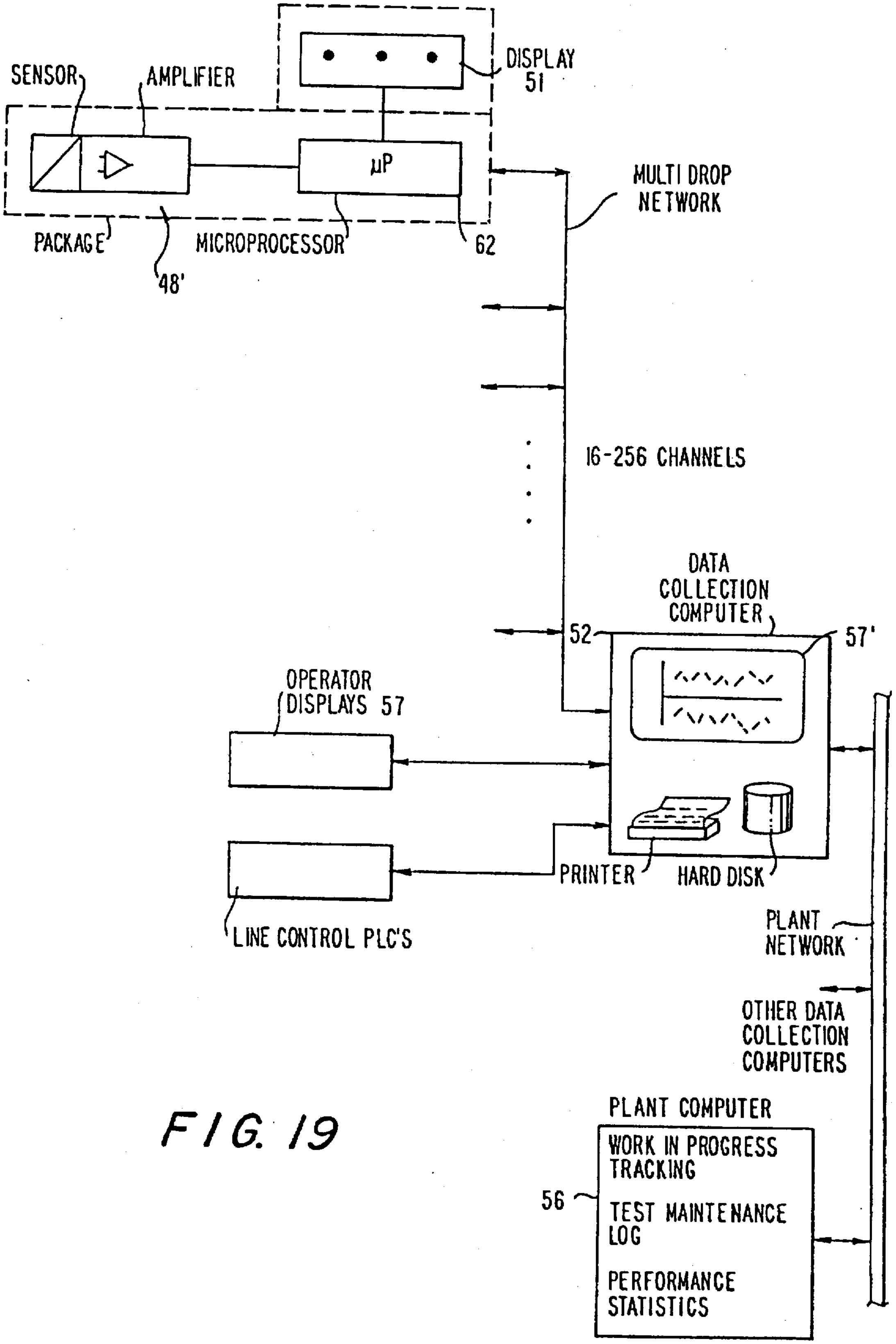

FIG. 19 is a schematic block diagram of an alternative arrangement of the monitoring and control system for a fluid driven tool in accordance with a preferred embodiment of the present invention.

FIG. 20 is a chart depicting typical computed parameters, inferred process conditions corresponding to particular values of the parameters, and probable causes of those conditions for a fluid driven RAN tool as reported by a system in accordance with a preferred embodiment of the present invention.

FIG. 21 is a chart depicting typical computed parameters, inferred process conditions corresponding to particular values of the parameters, and probable causes of those conditions for a fluid driven impact wrench as reported by a system in accordance with a preferred embodiment of the present invention.

Figure 22:
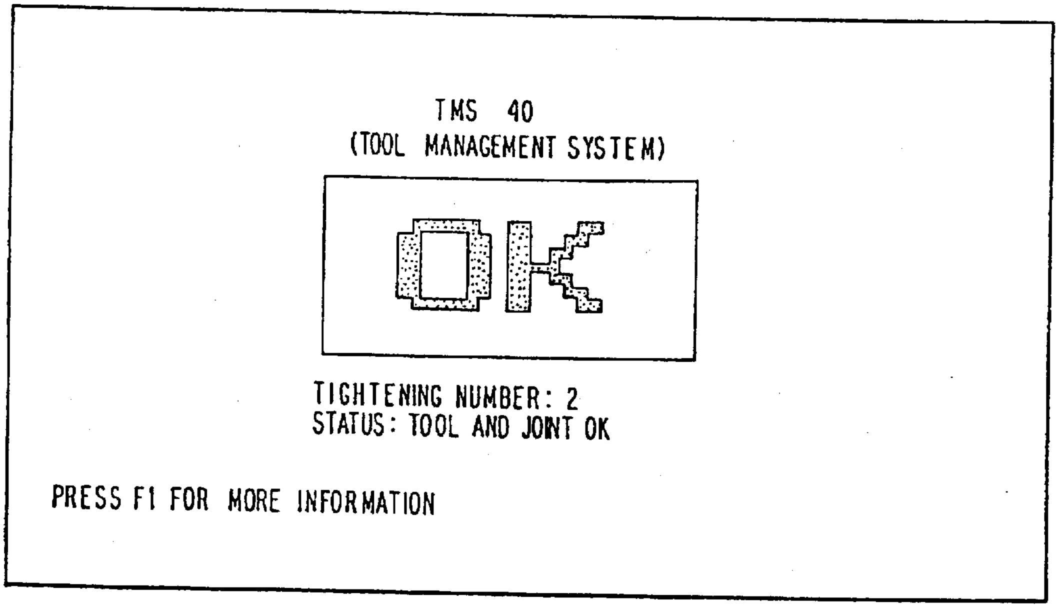

FIG. 22 is a representation of a typical display of the status of the inferred process condition as reported by a system in accordance with a preferred embodiment of the present invention, where the inferred process condition is normal.

FIG. **23*a*** is a representation of a typical display of the status of the inferred process condition as reported by a system in accordance with a preferred embodiment of the present invention, where the inferred process condition is abnormal.

Figure 23A:
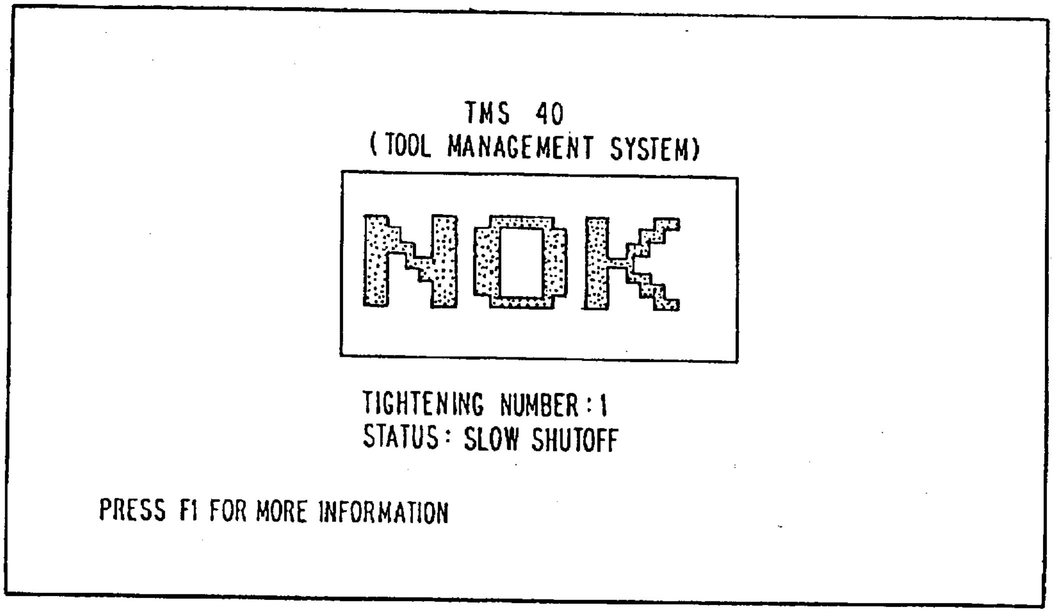

FIG. **23*b* is a representation of a typical display of the probable causes of the abnormal inferred process condition depicted in FIG. 23*a***.

Figure 24:
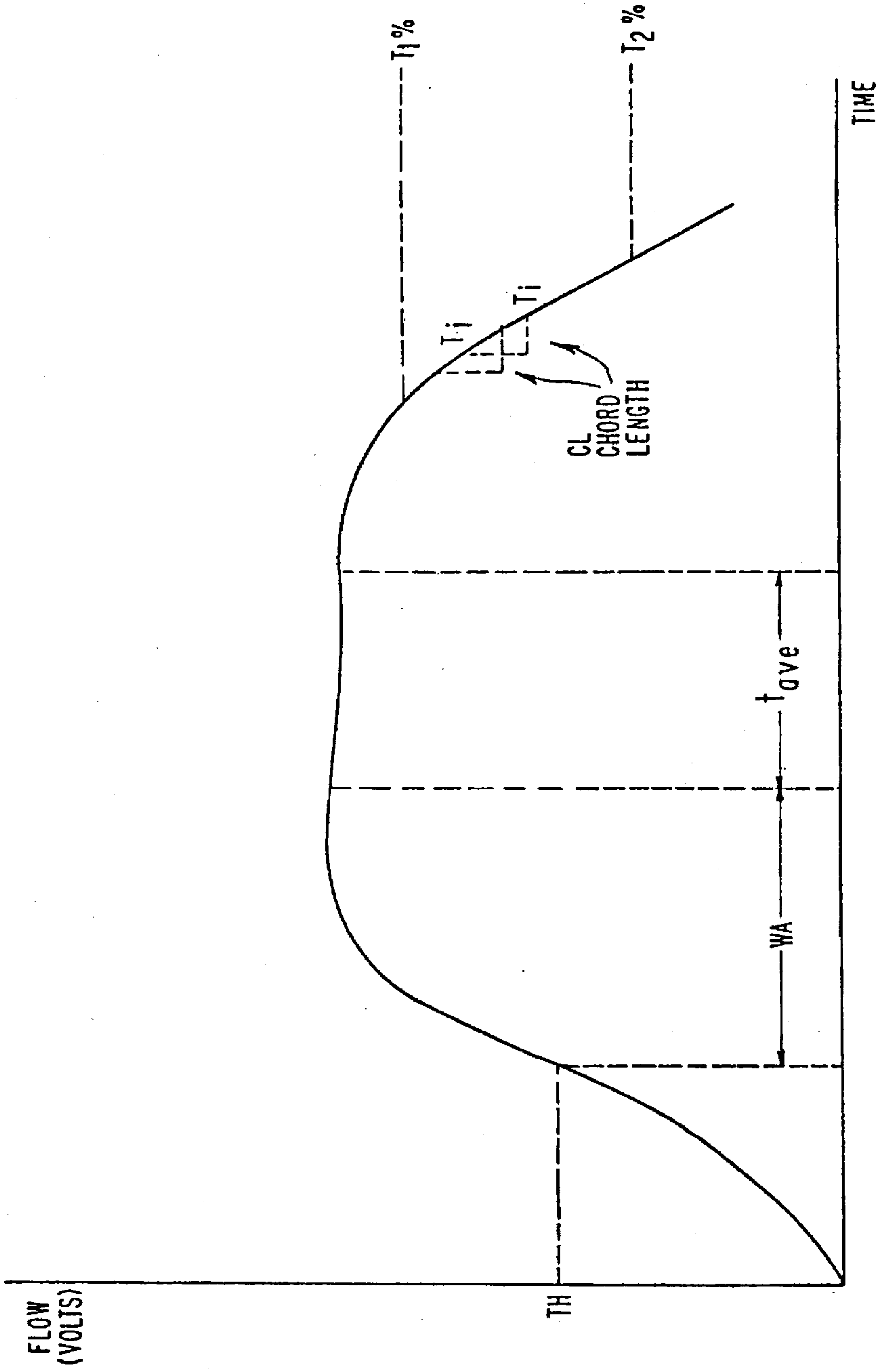

FIG. 24 is a graph of an idealized flow/time curve, showing typical locations on the curve where flow measurements are taken and from which certain parameters are computed.

DESCRIPTION OF THE PREFERRED EMBODIMENT

Figure 1:
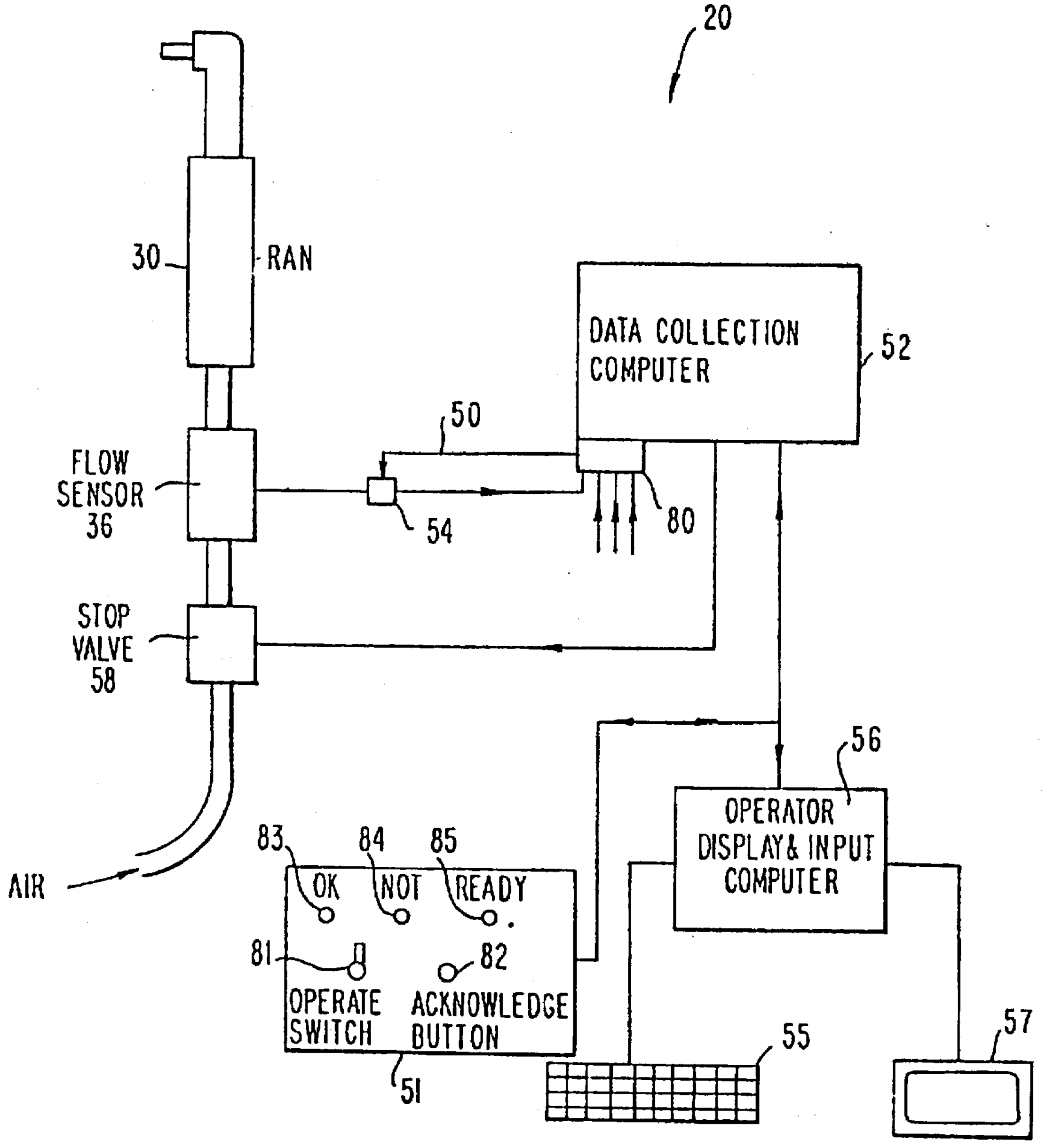
FIG. 1 is a schematic block diagram of a monitoring and control system for an nutrunner fluid tool in accordance with a preferred embodiment of the present invention.

Referring first to FIG. 1, a torque monitoring system 20 for a fluid driven nutrunner tool 30 is depicted. Nutrunner tool 30 includes a fluid motor (not shown in FIG. 1), which is typically of the vane, or turbine, type. Although a nutrunner type fluid tool is depicted, it is to be understood that the invention is also applicable to an impact type air or oil pulse tool, which also includes an air or oil driven motor.

Since there is typically only a small amount of expansion of the pressurized fluid within either an air or oil fluid motor, the fluid motor has the characteristics of a constant volume metering pump. It has been discovered that the fluid flow through the tool is substantially proportional to the rotational speed W. Furthermore, it has been discovered that the fluid flow may be determined by measuring the differential pressure across a venturi and that this pressure measurement may be performed using an inexpensive and rugged solid state differential pressure transducer.

At a fixed fluid pressure the output torque $T_o$ is related to the rotational speed W by the following formula:

$$T_o = T_s - KW$$

where Ts is the stall torque and K is a constant, the value of which is unique for a particular nutrunner tool and fluid pressure.

Figure 2:
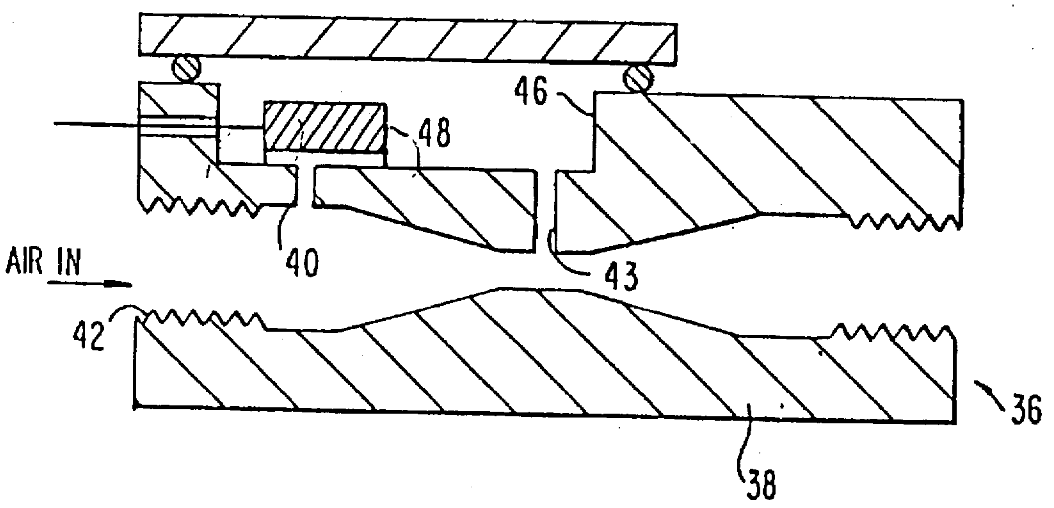
FIG. 2 is a sectional view of a fluid flow meter for use in a monitoring and control system in accordance with a preferred embodiment of the present invention.

Torque monitoring system 20 includes a fluid flow meter 36 mounted in the fluid line to the tool, preferably within about 10 feet from the tool. Fluid flow meter 36 is shown schematically in FIG. 1 and in cross section in FIG. 2. In the preferred embodiment depicted, flow meter 36 is a standard venturi-type differential pressure flow meter, having a venturi 38 with a high pressure take-off 40 on the fluid inlet side 42 and a low pressure take-off 44 at the neck of the venturi. Low pressure take-off 43 leads to a pressure chamber 46. There, a transducer 48 is situated between the high pressure take-off 40 and pressure chamber 46, to measure the differential pressure caused by flow through the venturi.

Transducer 48 is preferably a low cost semiconductor pressure sensor, and fluid flow meter 36 can be made not much bigger than a standard air fitting. The transducer 48 preferably has a 0 to 5 psi range but the overall pressure losses through the venturi would normally not be more than about 1 psi. Although the preferred embodiment of fluid flow meter 36 is depicted as employing a venturi and differential pressure sensor, it is to be understood that other flow measurement means, such as a turbine or vortex shedding meter, could be employed.

A venturi type flow meter is non linear and the fluid flow is proportional to the square root of the differential pressure signal. Accordingly, the theoretical relationship for the output torque is:

$$T_o = T_s - K^1 \sqrt{P}$$

where $K^1$ is a constant and P is the differential pressure measured at the venturi.

This relationship, which applies to any continuously rotating fluid tool, shows that the fluid flow can be used as a measurement and control parameter as it is directly correlated with the torque. Of course, flow may also be affected by many other factors, such as lubrication of the tool, pressure and joint conditions. These other factors complicate calibration of the monitoring system for measuring torque applied to the fastener per se. However, measurement of fluid flow is very useful in a monitoring system for a nutrunner tool to indicate when conditions change.

Of course, in an impact wrench, the fluid motor is only continuously rotating during the rundown phase. However, for practical purposes, the foregoing formula is also generally applicable to impact wrenches. In addition, in an impact wrench, the pulsed nature of the flow signal during the tightening (hammering) allows the blows (impacts) to be easily counted for monitoring or control purposes.

Figure 3:
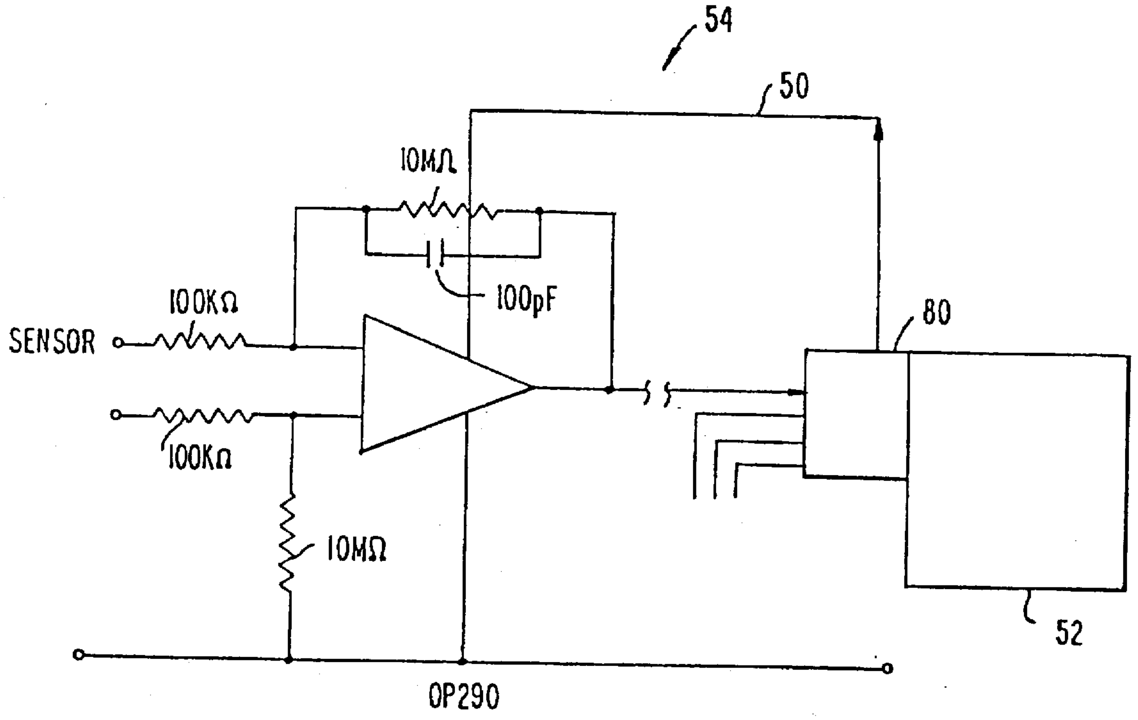
FIG. 3 is a schematic circuit diagram for a preamplifier for the fluid flow meter depicted in FIG. 2, for use in a monitoring and control system in accordance with a preferred embodiment of the present invention.

As depicted in FIGS. 1 and 3, the electrical signal from transducer 48 is fed to a data collection computer 52, which includes a suitably programmed microprocessor, through a data acquisition board 80. Data acquisition board 80 is preferably a PCL 818 16 channel data acquisition board. It should be noted, however, that a single fluid tool only requires one data channel. Thus, a single 16 channel data acquisition board can accommodate up to 16 separate tools.

A pre-amplifier 54, as depicted in FIG. 1 and 3, is also preferably included on the output from flow transducer 48 to amplify the signal from transducer 48 prior to feeding it through data acquisition board 80 to data collection computer 52. The distance between the sensor and the preamplifier should preferably be limited to 70 feet. The distance between the preamplifier 54 and the data acquisition computer is not important.

In addition, preamplifier 54 could incorporate circuits to convert the analogue signal to serial data format for transmission to the data acquisition computer.

An output 50 from computer 52 to pre-amplifier 54 may optionally enable or disable the pre-amplifier.

As schematically depicted in FIG. 19, the need for an external preamplifier, 54 may be eliminated by the use of a "smart" sensor 48', such as the 180PC from Honeywell Microswitch, in place of the conventional transducer 48. The circuit of a "smart" sensor 48' includes an on board amplifier 54'. This eliminates the need for careful wiring of low level signals and outputs a voltage which may be directly connected to the analog to digital input on the PC card. In addition, other circuits may be added on board the "smart" sensor 48' to perform temperature compensation and signal linearization.

As depicted in FIG. 1, data collection computer 52 is in two-way communication with operator display and input computer 56. The operator display and input computer 56 includes a suitably programmed microprocessor to perform mathematical operations on the data supplied it by data collection computer 52, to compute certain parameters as required, such as the snug point, which is computed as a percentage of the initial fluid flow rate to the tool during rundown. This enables the microprocessor to identify a portion of the signal representative of the fluid flow rate during tightening of the fastener beyond the snug point.

Operator display and input computer 56 outputs to a display 57, such as a CRT or a printing device, for displaying desired data. Preferably, the pertinent data is displayed in a graphical format, such as depicted in FIGS. 4*a* and 4*b*, but may also be displayed numerically or in any other intelligible manner. Preferably, display 57 is capable of simultaneously displaying pertinent data for at least two, up to about 15 or more, of the most recent tightenings. Operator display and input computer 56 also preferably includes input means 55, such as a keyboard, for the operator to input certain required parameters and specifications into the system.

The purpose of the computer 52 is to acquire the signal, process it and derive critical parameters according to predetermined algorithms, to compare this derived data with predetermined limits and to format the data for transfer to other computing devices 56 for storage, and to do further statistical processing of the derived parameters. It may also control interface device 51 to alert the operator as to tightening status. The system may be operated independent of computer 56.

Computer 56 may be part of the installed system or part of the user's own production statistical process control system, as depicted in the alternative system configuration depicted in FIG. 19. Its purpose is to accept the formatted data from computer 52 and to perform statistical process monitoring rules on the incoming data. It may also, while the system is in a "Learn" mode, that is, gathering data about a new fastener/joint/tool system and performing statistical analysis on this data (to be described below), suggest the control limits to be applied to the derived parameters in the data acquisition computer 52. It may also record on hard disk or other long term media all acquired and derived data for later retrieval or for archiving purposes.

The data will be processed within computer 52 and checked against upper and lower limits that have been previously set and formatted for transmission to operator display and input computer 56. The data transmitted to operator display and input computer 56 will include, at least, (1) average free run flow rate (i.e., average initial flow rate); (2) change of flow rate during tightening; (3) tool identification; (4) time at which tightening takes place (i.e., snug point); and (5) rundown time. Not all of this data need be displayed on display 57 at any one time. However, it is preferable to simultaneously display at least the initial fluid flow rate (prior to snug point) and the minimum and maximum range of fluid flow rate gradient, i.e., rate of change, during tightening, for each tightening displayed.

Of course, data collection computer 52 and operator display and input computer 56 may be physically separate or may employ the same suitably programmed microprocessor. The present system can be used for a single tool or, expanded for use in larger installations for the collection of data over a complete plant.

Data collection computer 52 also optionally outputs to a stop valve 58 (shown in FIG. 1), which is used to control the torque applied by the tool by shutting off the fluid at the desired point. To use fluid flow as a control parameter in a nutrunner tool, i.e., to control the torque applied by the tool as well as measure it, requires that shut-off valve 58 be of the fast acting type.

The data collection computer includes a buffer storage for the last 30 tightenings. Permanent storage of all tightenings is accomplished in the input and display computer 56 such as, for example, storage on a magnetic disk.

The data stored includes the data transmitted plus the raw data samples that are used to measure the slope of the fluid flow curve. The data itself is clocked at a fixed clock rate independent of the computer.

An operator interface unit 51 is preferably included for each tool and operatively connected to, and in two-way communication with, the data collection computer 52 and the operator display and input computer 56. Interface unit 51 is preferably located near the tool, preferably within 12 feet or so, to permit the operator of the nutrunner tool to monitor the performance of the tool. Interface unit 51 includes an "Operate" switch 81, an "Acknowledge" button 82, an "OK" light 83, a "NOT OK" light 84, and a "Ready" light 85.

"Ready" light 85 is lit by a signal from data collection computer 52 when the data collection computer 52 is ready to collect data. "Okay" light 83 is lit when the data collection computer signals that the data collected is in accordance with specification, that is, when the data collected is within predetermined minimum and maximum values. "Okay" light 83 stays on for preferably two seconds to give the operator time to take action. "Not okay" light 84 is lit when the data collected is not in specification, and stays on permanently until the "Acknowledge" button 82 is pressed by the operator. The position of "Acknowledge button 82" is preferably communicated to both data collection computer 52 and operator display and input computer 56. In lieu of lights, other visual displays for the "Okay" and "Not Okay" conditions may be employed.

Placing the "Operate" switch 81 in the "off" position instructs the data collection computer 52 that data should not be collected, such as by a signal through enable/disable connection 50 to preamplifier 54. Placing the "Operate" switch 81 in the "On" position enables data collection. The position of "Operate" switch 81 is preferably communicated to both data collection computer 52 and operator display and input computer 56.

In the system depicted in FIG. 1, the sampled data from sixteen tools is star wired to a data collection computer 52. The data collection computer 52 processes the data and derives the parameters from the sampled data. The parameter data may then be forwarded throughout the plant over a network to wherever it is required.

In the alternative scheme depicted in FIG. 19, the sensor 48 and amplifier 54 are replaced with a "smart" sensor 48' and a dedicated processing unit 62 is provided, packaged together or closely. The processing unit 62 has an integral multidrop network connection. A separate local interface unit 51 on or in in close proximity to tool itself, may also be part of this assembly. In this case, the local interface unit 51 may be controlled either by the dedicated processing unit 62 or by the computer 56 across the network. The use of a dedicated microprocessor for each tool is advantageous because it limits the amount of data traffic networked across the plant and introduces robust digital data transmission as early as possible in the data acquisition system. It also reduces or eliminates, depending on the sophistication of the dedicated microprocessors, the need for separate data collection computers.

The monitoring system of the present invention operates as follows. To initially set up the system, the system is first switched on by a power switch (not shown). After switch on, a special "set up" program is automatically called up by operator display and input computer 52 to enable the operator to make the following settings on operator input and display computer 52 for each channel of data collection:

Gain
Initial trigger level
Delay before measurement
Measuring period for flow rate
Trigger point for flow gradient measurement
Chord length for flow gradient
Sample rate
Delay time before next measurement on channel
Maximum and minimum values for flow, flow gradient and run down time Preferably, the program should prompt and advise the operator on which values to use, e.g. that the chord length setting could be based upon a hard, normal or soft joint characteristics.

After set up is complete, data collection may begin when the operator actuates the "Operate" switch 81 on interface unit 51. At the start of data collection, the "Ready" light 85 comes on. Next, the operation of the fluid tool causes the signal representative of flow to increase until it reaches the "trigger" value (approximately 1.8 volts), which automatically causes the system to begin to collect and process data. The signal is then checked by the system to determine if the values of flow, flow gradient and rundown times are within predetermined minimum and maximum limits set by the operator.

When all values are acceptable, the "Okay" signal is given, lighting the "Okay" light 83. This light then switches off after two seconds and the "Ready" light 85 comes back on. The "Not Okay" light 84 is lit given when one or more of the parameters set in computer 52 are out of specification. "Not Okay" light 84 remains lit until the operator presses the "Acknowledge" button 82.

In addition, when the system is not in the "Operate" mode it may be in "Learn" mode. This is used when the limit values to be used are unknown. A series of "normal" tightenings, preferably at least 25, may be performed and the results recorded manually or transferred automatically to the computer 56 (or computer 52). By statistically evaluating these results in computer 56 (or computer 52), useful limits may then be set in computer 52. These limits may then be used for trapping (identifying) trends or deviations from learned normal conditions.

To accomplish this, preferably, the system includes means for recording at least one parameter for a series of tightenings during normal conditions, means for statistically processing the parameter to compute appropriate limits for the normal conditions for this parameter, and means for storing these limits. During subsequent tightenings, the parameter computed during subsequent tightenings will be statistically processed by either computer 52 or 56 to identify trends or deviations from the normal conditions. Means for notifying an operator of such trends or deviations are also included. This may include an alarm, or simply a display reflecting the existence of such trends or deviations.

During data collection, data is held temporarily in a buffer storage (not shown) in data collection computer 52, and then formatted and transmitted to operator input and display computer 56. Data from the last 30 tightenings only will be held in the buffer. This data will also include the samples used for flow measurement. When this data is being viewed, the data collection will stop and the "Ready" light 85 goes off.

During data collection, the operator input and display computer 56 preferably displays the status of each channel, updated every one half second. That is, the status of each data channel is indicated with the channel number, whether it is "Okay", "Not Okay", and "Ready" or not. When "Not Okay" is displayed, the reason for the failure is also displayed on the operator input and display computer 56 display 57 or computer 52. This is held until the "Acknowledge" button 82 is pressed. It should also be noted that in the context of the present invention, the "Okay" or "Not Okay" conditions are themselves parameters which are functions of the fluid flow rate to the tool, since they depend upon the magnitude of the fluid flow rate (as well as time, and other variables).

During operation, the computer displays the information on the initial flow and the rate of decrease of this flow for the previous 15 tightenings or so in a chart recorder, or other type of display, as shown in FIGS. **4*a* and 4*b*. This enables any deviations from normal operations to be easily detected. For example, in FIG. 4*a*, all displayed values for the five tightenings are within specification. In FIG. 4*b***, the last tightening is outside of specification, which is immediately apparent from the display.

In addition, a suitable menu is preferably displayed on display 57 of operator display and input computer 56 to facilitate operator interaction with the system.

The monitoring and control system of the present invention could be powered either by available AC power or by battery, and would only require a very simple low cost electronic circuit. The system can be configured as a stand alone device or can be part of a plant wide information collection system. Furthermore, all the elements could be incorporated into one unit which can then be mounted remotely from the wrench.

Figure 4:
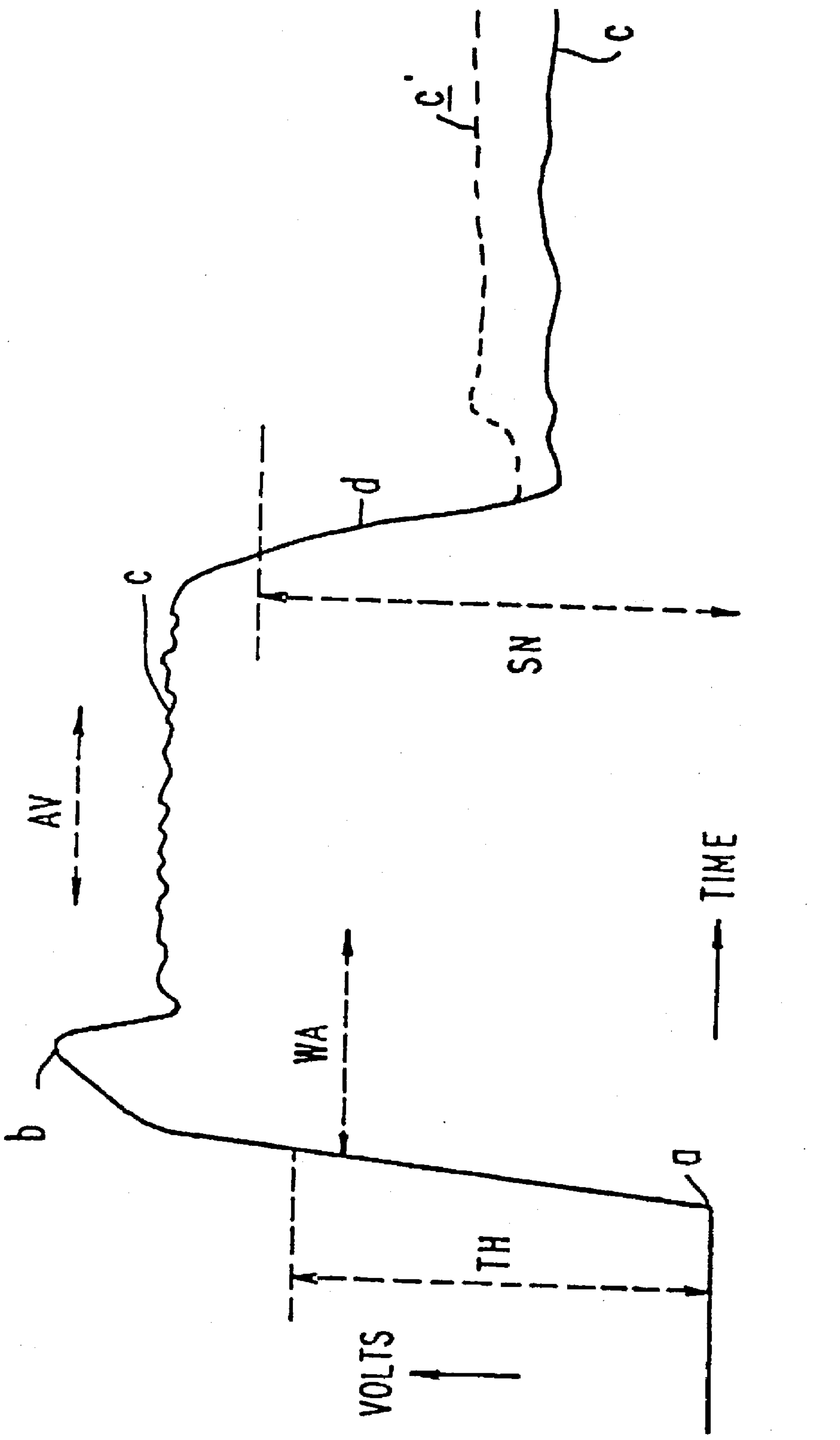
FIG. 4 is a graph of a typical flow signal from the fluid flow meter of a monitoring and control system in accordance with a preferred embodiment of the present invention, used on a nutrunner fluid tool, depicting regions of the flow curve containing important parameters.
Figure 4A:
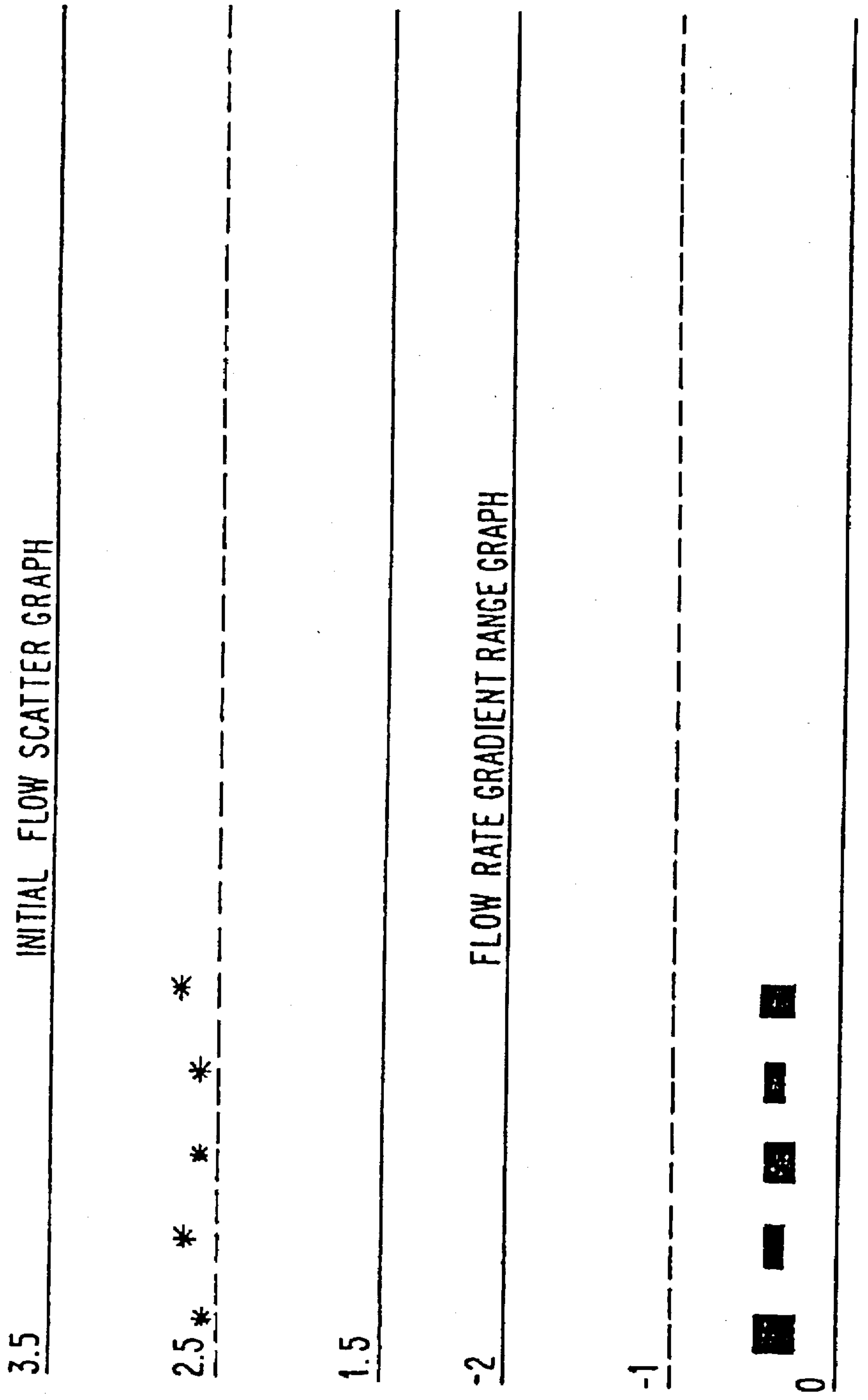
Figure 4B:
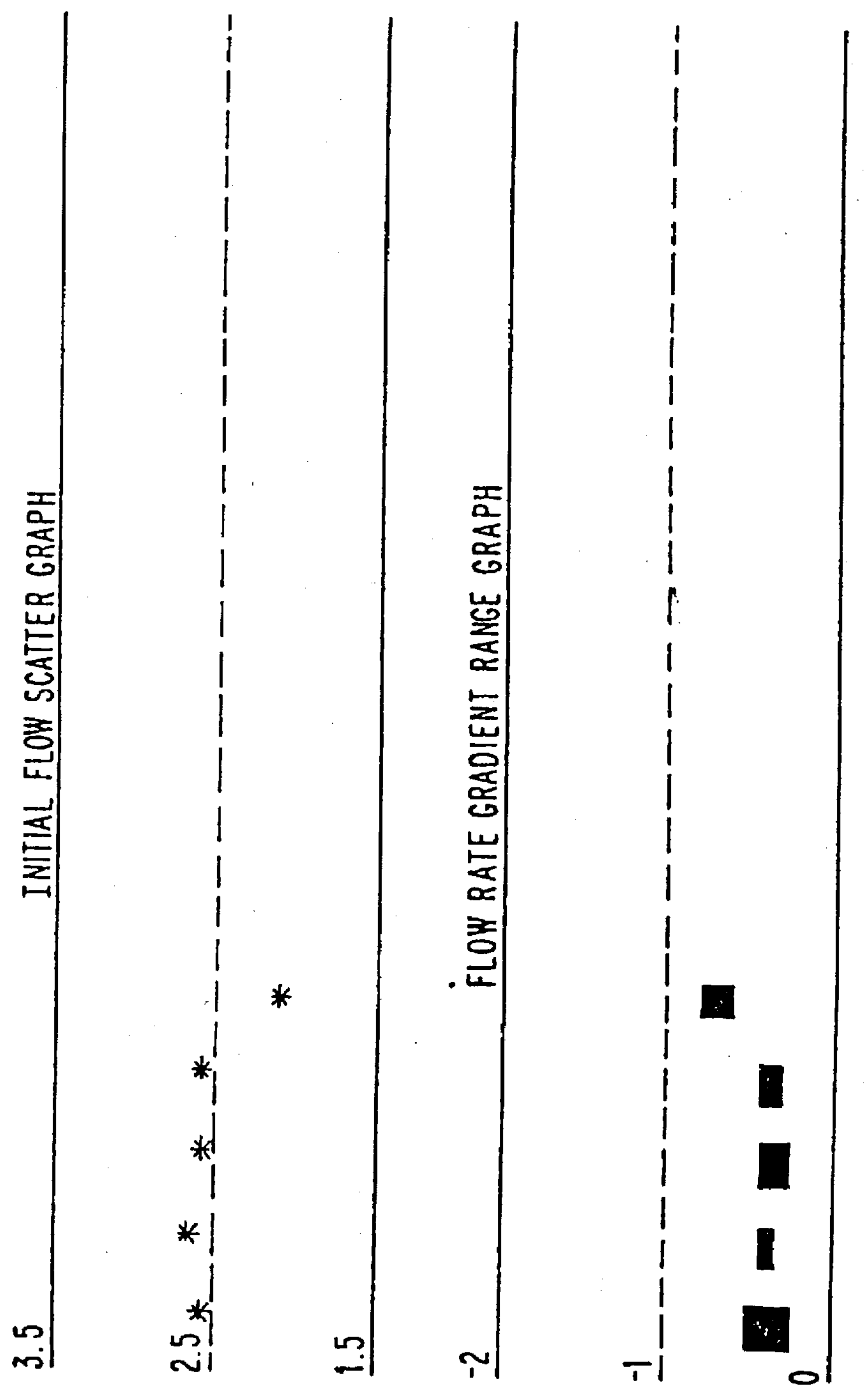

The signal obtained during a typical tightening is shown in FIG. 4. Particular regions of interest on this curve are denoted as a–e, where a represents tool "switch on" (i.e., fluid begin to flow to tool 30); b represents the initial fluid surge to the tool, c represents the initial flow, prior to reaching the snug point, d represents the tightening phase, and e represents the flow rate after the tool has stalled. The dotted line e' represents another possible flow rate at stall for the same conditions.

Also noted on this graph are the meaning of various parameters required to set up the system to enable proper data collection, and typical values for those parameters. These include:

| Symbol | Description | Typical Values |
|---|---|---|
| TH | Trigger threshold for signal, Volts | 1.8 |
| WA | Delay to eliminate initial surge, milliseconds | 6.0 |
| AV | Time over which flow measurement are averaged, milliseconds | 50 |
| SN | Drop in flow used to trigger slope measurements, volts | 0.88 |
| DA | Transducer energisation, voltage | 7 |
| MF | Slope measurements either side of maximum used to determine minimum, number | 3 |
| LD | Approximate delay between samples, microseconds | 600 |

It should be noted that "AV" in the foregoing table, and on FIG. 4, has the same meaning as "$T_{av}$" on FIG. 24. "SN" in the foregoing table, and on FIG. 4, has the meaning as "$T_1$ %" on FIG. 24.

The actual values, of course, depend upon the nature of the joint, tool, fastener etc., and are set by the operator during set-up.

The active part of a tightening performed by an air driven power tool may be completed as quickly as 10 msecs. To derive a usable gradient parameter, a sample rate of a least 2 kHz is required.

With respect to the fluid flow rate curve itself, that is, the fluid flow signal output from the transducer during operation of the tool, two of the most important pieces of information in this signal are the initial flow rate c, and the rate of decrease of this signal as the tool slows down during the tightening process d. The time elapsed during the rundown phase (i.e., region c) is also an important parameter.

Measurement of fluid flow after the tool has stalled (in region e and e') has been found to be less useful. This is because the vanes in the fluid motor can come to rest in different positions which will give different resistances to the fluid flow, resulting in quite a large variation in the signal for otherwise similar conditions.

It has been discovered that the peak, b, shown on the curve of FIG. 4 is caused by the volume of air enclosed in the chamber, 46. This surge may be eliminated in another flow sensor configuation as depicted in FIG. 18. In this design, a tra8sducer 48 is contained within the sealed chamber 46. Transducer 4' has respective connections to an upstream pressure connection 40' and a throat pressure connection 43'. A separate upstream pressure connection 47 is used to apply a common mode pressure to the interior of sealed chamber 46, and thus to the outside of sensor 48. However, upstream pressure connection 40' is separate from the volume of chamber 46 and the pressure in the volume of fluid in chamber 46 only serves to equalize pressure on the outside of sensor 48. Thus, the surge represented by point b on FIG. 4 may be minimized or eliminated. Of course, a "smart" sensor 48' may also be employed.

The initial flow rate indicates any changes in fluid pressure and variations during the rundown phase. Changes in the initial fluid flow and/or length of rundown time, between otherwise similar tightenings indicate changes in fluid pressure, lubrication of the fastener, rundown torque of the fastener, and tool conditions. The slope of the curve in the tightening region d indicates joint conditions, including hardness of the joint, and improper operation, i.e. free running or pretightened fastener, and any variations that occur during the tightening phase. Changes in the rate of decrease of the flow between otherwise similar tightenings indicate that the joint conditions have changed, i.e. threads crossed, hole not properly tapped, gasket material omitted, etc.

The system will need to be set-up initially for each tool and joint but will then give a very sensitive indication of any changes that take place during operation between otherwise nominally identical fasteners.

To infer process conditions relating to the tightening process, during a tightening cycle, the derived parameter, for example, speed during rundown, is determined according to the measured data and preprogrammed formulae and compared to predetermined expected limits or ranges (i.e., high speed, low speed, outside low speed limit, normal).

The preprogrammed formulae may include, for example, formulae relating flow rate to tool speed (listed above), formulae for calculating of flow rate gradient during tightening, and statistical process control formulae used for deriving the desired parameters.

In the preferred embodiment a number of parameters are derived to help select the appropriate portion of the flow time curve over which to measure the average speed. These include a threshold (trigger) value TH, a time delay WA and an averaging time $t_{av}$. The speed is then computed as the arithmetic mean of the samples taken in the time period $t_{av}$.

In the preferred embodiment a number of parameters are derived to help select the appropriate portion of the flow time curve over which to measure the flow gradient during the active phase of the tightening process. These levels are expressed as a percentage of the previously described mean speed level. The mean gradient is measured between the two points $T_1$% and $T_2$% according to the following formula. For each sample, i, of i=1 to n samples:

$$Tf_i = Tf_{i-1} + (Tf_{i-1})/4 \; [Tf_0 = 0]$$

$$G_1 = Tf_1 - Tf_{i-cl} \; [Tf_i = 0, \text{ for } < cl]$$

where $T_i$ are the sample values $Tf_i$ are filtered sample values $G_i$ are the gradient values cl is the chord length The mean gradient is taken as the arithmetic mean of $G_i$, for i=i to n.

Time may be measured from any significant point on the curve to any other significant point on the curve. In the preferred embodiment time is measured form the threshold point TH on the curve to the point $T_2$% on the curve.

FIG. 24 diagrammatically represents an idealized curve of flow versus time for the purpose of illustrating the meaning of some of the foregoing settings as the affect data collection and computation of pertinent parameters. In FIG. 24, the initial trigger level is represented as "TH", which is conveniently approximately one half of the magnitude of the expected rise in the measured flow rate. The purpose of the trigger setting "TH" is permit the system to reliably automatically detect that a new tightening cycle is being started, while ignoring low level noise and false starts.

The delay before the initial measurement period begins is represented as time period "WA" on FIG. 24. During time period "WA" flow meaurements are ignored by the system, at least for purposes of determining the flow rate during the rundown phase. Time period "WA" is set for a sufficiently long period of time to ensure that measurements are not taken until past the first "knee" on the flow/time curve, and for a short enough period so that adequate time remains during the rundown phase (the plateau on the curve) to obtain several flow measurements.

The measuring period for flow rate is represented on the curve of FIG. 24 as time period "$t_{ave}$" Time period "$t_{ave}$" is set sufficiently long so that several flow measurements can be taken and averaged together, but sufficiently short so that the second "knee" of the flow/time curve is avoided. The average of the flow measurements taken during "$t_{ave}$" gives a parameter representative of the average speed of the tool during the rundown phase.

Flow rate measurements continue following the termination of "$t_{ave}$". Several measurements are preferrably averaged together to minimize the effect of noise. The measured flow rate during this period is compared to the predetermined trigger point for determination of the gradient of the flow during the tightening phase. The trigger point is represented as "$T_1$%" on FIG. 24, and corresponds to an assumed "snug point". "$T_1$%" is preferably such as to be past the second "knee" on the curve, while leaving sufficient time for several measurements of flow rate during the tightening phase, prior to "$T_2$ %", which represents the end of flow measurements used to determine the average gradient (i.e., the rate of decrease of flow rate over time). A typical value of "$T_1$ %" is 70% of the average flow measured during "$t_{ave}$" "$T_2$ %" may be any value sufficent to permit enough measurements of flow/time to minimize the effects of noise prior to the point at which the fastener is fully tightened.

The time period between flow measurements used to determine the gradient is referred to as the "chord length" and is represented on FIG. 24 as "cl". As noted on FIG. 24, the time periods (i e., chord lengths) of successive "$T_i$" gradient measurement time periods may, and preferably do, overlap. This allows more measurements during a shorter period, thus helping to minimize the effect of noise. The chord length "cl" should be sufficiently long to minimize the effect of noise, but short enough to permit several measurements of flow/time between "$T_1$ %" and "$T_2$ %".

FIG. 20 is a presentation of the logic and methodology used to derive (i.e., infer) the process information regarding the tightening performance (i.e., the process conditions) and to determine and/or report probable causes of the inferred process condition) of a RAN tool. The leftmost column contains the derived (i.e., Computed) parameter, e.g., speed, joint slope (gradient). The next column states the value of the measured data with respect to predetermined limits or ranges to which the measured data has been compared, the rightmost column names the inferred process condition and various probable causes of the process conditions that would generate such measured data. The probable causes of the particular inferred process condition are listed in sequence top to bottom in order of most probable first.

Predetermined expected limits or ranges for the measured data, and various inferred process conditions for the particular predetermined expected limits or ranges, and the probable causes for those inferred process conditions, are stored in either computer 52 or 56. These predetermined limit values or ranges of the derived parameters are those either entered during system setup or 'learned' through a run of at least about twenty five 'good' tightenings and generated automatically.

If all derived parameters are in the normal range, this is reported to either or both of computers 52 and 56 and preferably displayed to the operator, preferably by means of an alpha numeric display such as is depicted in FIG. 22. This display indicates the tightening number (i.e., "2") and the process condition status (i.e., "Tool and Joint OK"). This quickly assures the operator that the performance of the tool and the joint components are all as they were on system setup and calibration.

Figure 23B:
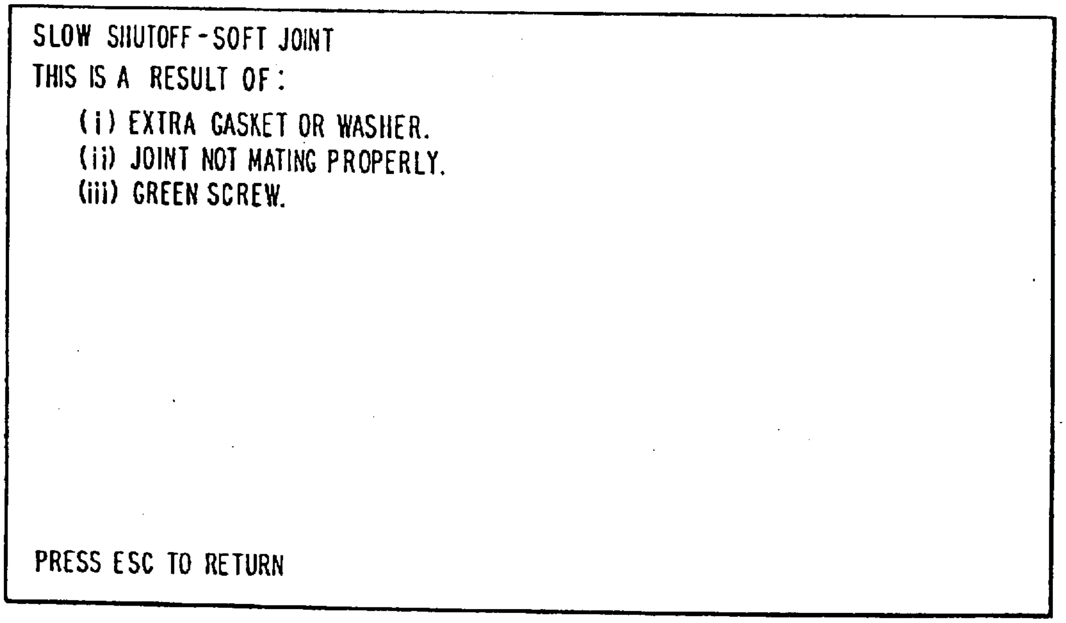

In the event that one or more of the derived parameters are outside the normal range when compared to the predetermined expected values, a particular abnormal process condition is inferred. For example, the tool rundown speed parameter may be determined to be high, low, or outside the low speed limit, as depicted in middle column in the upper half of FIG. 20. In this case, the corresponding inferred abnormal process condition is reported to either or both of computers 52 and 56. It is also preferably displayed to the operator, preferably by means of an alpha numeric display. A typical example of such a display, generated when the measured joint slope (i.e. gradient, or rate of decrease of flow over time) fell into the "soft" (less steep than normal) range, is depicted in FIG. 23*a*. This display indicates the tightening number (i.e., "1") and the inferred process condition status (i.e., "NOK" and "Slow shutoff") from a "soft" (less steep than normal) gradient during the tightening phase. The operator may then press a key (for example, "Fl") on input device 55 of computer 56 for more information. Doing so brings up a new alpha numeric display, as depicted in FIG. 23*b*, indicating the inferred process condition "slow shutoff—soft joint" and a list of probable causes of that inferred process condition.

Further derived parameters, such as time (from any significant point on the flow/time curve), plateau time (length of time during rundown), falloff time (length of time during the tightening phase), total time (from the trigger point to shut off), dead time (the time between separate tightenings), and/or mean, standard deviation, or trend (of any of the derived parameters) may be detemined. These additional derived parameters could then be included in a table such as FIG. 20, and predetermined expected limits or ranges of these parameters stored in either or both of computers 52 or 56. The actual derived parameters would then be compared in the computer with the predetermined expected limits or ranges of these parameters in a similar manner to that explained above, to further break down the list of probable causes which would generate a particular derived parameter set.

The analysis approach outlined above for inferring process conditions lends itself to the application of Artificial Intelligence and Fuzzy Logic rules. Preferably, a simple forward chaining rule based expert system is used, but this would be further enhanced by the implementation of fuzzy logic. For example, instead of a speed having the attribute normal or high, there would be several levels of speed 'highness' as in, fairly high, quite high, high, very high and extremely high. When this analogue or 'fuzzy' approach is taken to test a parameter value for membership of an inference rule, the result need not be expressed as a certainty, but as a probability. This more closely follows that happens in the real world. The software would then list probable process conditions, probable causes, and their respective probabilities, in descending order.

A presentation of the logic and methodology used to derive (i.e., infer) the process information regarding the tightening performance (i.e., the process condition) and to determine and/or report probable causes of the inferred process condition) for an impact wrench is depicted in FIG. 21. In the leftmost column of FIG. 21 are the derived parameters for impact wrenches, the next column the value of the measured data with respect to predetermined limits or ranges to which the measured data has been compared, and the rightmost column, the inferred process condition and various probable causes of the inferred process condition or conditions, in a similar manner to that displayed in FIG. 20 for a RAN tool. Time is also an important parameter in helping to infer process conditions for impact wrenches.

EXAMPLE 1

Measurements were made using a fully instrumented Stanley Right Angle Nutrunner (RAN), Ser. No. A40 LA 2XNCGZ—8/SPI. The tool was operated in the stall torque mode and the torque and air flow monitored for different conditions. Typical results are shown in FIGS. 11–14. Ten tightenings of a hard joint (i.e., with no gasket) were made at different air pressures and they all show a good correlation between the torque and the air flow.

Other measurements were made after changing the joint conditions. These showed similar start and stop conditions but with a different slope.

Tests were carried out using a joint whose hardness could be varied by including a load cell and gasket material. Curves showing the hardness characteristics of the joints used are shown in FIG. 5.

The tables of FIGS. 6–10 give the results obtained on the joint with load cell (i.e., medium hardness), with preload and breakforward torque with different air pressure. The tool is operating in stall torque mode and there is quite a large variation in the results obtained at each pressure level. However, changing the pressure produces a significant change in the initial flow together with a smaller change in the slope. The slope changes as it is measured with respect to time rather than angle. FIG. 9 shows the effect of making the joint softer (i.e., by including a gasket). The preload is significantly changed as is the maximum flow gradient. When the joint is made hard (i.e., joint only, with no load cell and no gasket), it was no longer possible to measure the preload. However the gradient is increased as is the torque level.

The monitoring and control system of the present invention may also be used with an impact wrench. Such a configuration is depicted in FIG. 14 as system 21'. System 21' employs an impact wrench 60, a flow meter 36' (which is conveniently of the same type employed depicted in FIG. 2 for a nutrunner tool), a shut off valve 58', and a control computer 52'. Control computer 52' functions in substantially the same manner as the data collection computer 52 used with a nutrunner tool. Preferably, the system also includes an operator interface unit; an operator input and display computer, an input device and a display, in the same manner as for a nutrunner tool. However, for simplicity, these are omitted from FIG. 14.

When the monitoring system of the present invention is used with an impact wrench, additional information, such as detection of impacts, is available. This is shown graphically in FIGS. 15–17. The individual impacts during tightening and/or untightening are clearly shown on these graphs as peaks on the curve of air flow meter output vs. time. This additional information on individual impacts provides a measure of the energy imparted to the fastener, thus simplifying a control system in comparison with a nutrunner tool.

For example, a control system based on counting impacts employing a control computer 52' including a suitably programmed microprocessor could be used which could easily be fitted to any impact wrench without alteration of the wrench. The wrench would be operated in the normal way, but the control computer 52' would generate a signal after a predetermined number of impacts during tightening had been reached. This signal would then activate a stop valve 58' after the predetermined number of impacts had been detected. The unit could have a timed reset or have a separate reset button for use by the operator. Furthermore, stop valve 58' need not necessarily be of the fast acting type when used with an impact wrench.

An impact wrench has a very different air flow characteristic from a RAN wrench. See, for example, FIG. 15 (impact wrench) and FIG. 4 (RAN wrench). Different parameters and inference rules are used as outlined in FIG. 21, but the same approach may be taken to infer information about the tightening process.

The speed of the impact wrench is determined by the impact pulse height and this determines the amount of energy imparted to the joint at each impact. The number of pulses are counted and this gives the total energy imparted to the joint during tightening. The presence of a slow increase of the pulse height to a plateau region indicates a rundown phase, as depicted in FIG. 15. Its absence indicates a pretightened joint.

EXAMPLE 2

The monitoring system of the present invention was applied to a low cost impact wrench manufactured in Japan that did not have any manufacturer's name or serial number. The wrench was capable of tightening to torque levels of about 100Nm.

Graphs of various tests of the monitoring system applied to this wrench are shown in FIGS. 15–17. The signals clearly show the rundown period and also give a very clear indication of when the unit starts to produce impacts.

There are numerous configurations possible by rearranging the system level at which the required system functions are performed. In the preferred embodiment, the required functions are sense, amplify, digitize, process (generate parameters), compare (apply expert system rules) and report (to operator, line controller PLC, plant work in process database, statistics processor, tool maintenance database, etc.). Preferably, the signal is also conditioned by, for example, linearization and temperature compensation.

The structure and operation of the monitoring and control system of the present invention is believed to be fully apparent from the above detailed description. It will be further apparent that changes may be made by persons skilled in the art without departing from the spirit of the invention defined in the appended claims.

What is claimed is:

1. A system for monitoring a fluid driven impact wrench for driving threaded fasteners comprising:

means for measuring the fluid flow rate into the wrench during operation of the tool with the flow measurement representing a cycle of torque application;

means for converting the measured fluid flow rate into an electrical signal;

means for electrically computationally processing said signal to transform said signal into another signal representing as least one parameter corresponding to a condition of said wrench to be monitored which is a function of said fluid flow rate; and means for displaying said parameter.

2. The system defined in claim 1, wherein said means for processing said electrical signal further comprises means for counting fluid flow peaks corresponding to individual impacts of said wrench.

3. The system defined in claim 2, wherein said means for processing said electrical signal further comprises means for calculating the torque applied by the wrench during tightening by counting fluid flow peaks corresponding to individual impacts of said wrench.

4. The system defined in claim 3, wherein said means for processing said electrical signal further comprises means for generating a signal after a predetermined number of impacts during tightening has been reached.

5. The system defined in claim 4, further comprising means for shutting off fluid to said wrench in response to said signal.

6. A method for monitoring a fluid driven impact wrench for driving threaded fasteners comprising:

measuring the rate of fluid flow into the wrench during operation of the tool with the flow measurement representing a cycle of torque application;

converting the measured fluid flow rate into an electrical signal;

electrically computationally processing said signal to transform said signal into another signal representing at least one parameter corresponding to a condition of said wrench to be monitored which is a function of said fluid flow rate; and displaying said parameter.

7. The method defined in claim 6, further including the step of counting fluid flow peaks corresponding to individual impacts of said wrench.

8. The method defined in claim 7, further comprising the step of calculating the torque applied by the wrench during tightening by counting fluid flow peaks corresponding to individual impacts of said wrench.

9. The method defined in claim 7, further comprising the step of generating a signal after a predetermined number of impacts during tightening has been reached.

10. The method defined in claim 9, further comprising the step of shutting off fluid to said wrench in response to said signal.

11. A system for controlling a fluid driven impact wrench for driving threaded fasteners comprising:

means for measuring the rate of fluid flow into the wrench from a fluid supply during operation of the tool with the flow measurement representing a cycle of torque application;

means for converting the measured fluid flow rate into an electrical signal, means for electrically computationally processing said signal based on said measured fluid flow rate to transform said signal into another signal counting the number of blows delivered by the wrench;

means for shutting off the fluid supply to the tool when a predetermined number of blows have been delivered; and means for displaying the number of blows counted.

* * * * *